US012804587B2

(12) United States Patent
Dai et al.

(10) Patent No.: US 12,804,587 B2
(45) Date of Patent: Nov. 17, 2026

(54) NETWORK-ASSISTED DISCOVERY FOR SIDELINK POSITIONING

(71) Applicant: QUALCOMM Incorporated, San Diego, CA (US)

(72) Inventors: Jing Dai, Beijing (CN); Alexandros Manolakos, Athens (GR); Seyedkianoush Hosseini, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/693,049

(22) PCT Filed: Sep. 23, 2021

(86) PCT No.: PCT/CN2021/119806

§ 371 (c)(1),
(2) Date: Mar. 18, 2024

(87) PCT Pub. No.: WO2023/044646

PCT Pub. Date: Mar. 30, 2023

(65) Prior Publication Data

US 2025/0008470 A1 Jan. 2, 2025

(51) Int. Cl.
*H04W 64/00* (2009.01)
*H04B 17/318* (2015.01)
(Continued)

(52) U.S. Cl.
CPC .......... *H04W 64/00* (2013.01); *H04B 17/328* (2023.05); *H04L 1/1812* (2013.01); *H04L 5/0051* (2013.01); *H04W 92/18* (2013.01)

(58) Field of Classification Search
CPC .... H04W 92/18; H04W 64/00; H04L 1/1812; H04L 5/0051
See application file for complete search history.

(56) References Cited

U.S. PATENT DOCUMENTS 9,913,093 B2 3/2018 Hwang et al.
2016/0095080 A1 3/2016 Khoryaev et al.
(Continued)

FOREIGN PATENT DOCUMENTS

WO 2014083494 A2 6/2014
WO WO-2016076778 A1 5/2016
(Continued)

OTHER PUBLICATIONS

International Search Report and Written Opinion—PCT/CN2021/119806—ISA/EPO—Jun. 20, 2022.
(Continued)

*Primary Examiner* — Margaret G Webb
(74) *Attorney, Agent, or Firm* — Thien T. Nguyen

(57) ABSTRACT

Disclosed are techniques for wireless communication. In an aspect, a user equipment (UE) may receive an announcement message from each sidelink anchor device of one or more sidelink anchor devices, wherein the announcement message includes a sidelink anchor device identifier and an indication that the sidelink anchor device is available for positioning services. The UE may measure the announcement message from each sidelink anchor device to determine a signal strength measurement associated with the sidelink anchor device. The UE may report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

26 Claims, 19 Drawing Sheets

(51) Int. Cl.

| | |
|---|---|
| ***H04L 1/1812*** | (2023.01) |
| ***H04L 5/00*** | (2006.01) |
| ***H04W 92/18*** | (2009.01) |

(56) References Cited

U.S. PATENT DOCUMENTS

| | | | | |
|---|---|---|---|---|
| 2019/0239181 | A1 | 8/2019 | Gangakhedkar et al. | |
| 2020/0092685 | A1* | 3/2020 | Fehrenbach | H04W 72/23 |
| 2022/0014875 | A1* | 1/2022 | Rybalko | H04W 4/029 |
| 2022/0337349 | A1* | 10/2022 | Lee | H04W 4/40 |
| 2023/0062805 | A1* | 3/2023 | Baek | H04L 5/0091 |
| 2024/0063958 | A1* | 2/2024 | Christoffersson | H04L 5/0048 |
| 2024/0313906 | A1* | 9/2024 | Panzner | H04L 1/1854 |

FOREIGN PATENT DOCUMENTS

| | | | |
|---|---|---|---|
| WO | WO-2019027245 | A1 | 2/2019 |
| WO | 2020218902 | A1 | 10/2020 |
| WO | 2021075851 | A1 | 4/2021 |
| WO | 2021133104 | A1 | 7/2021 |

OTHER PUBLICATIONS

Intel Corporation: "Analysis of Anchored and Non-anchored D2D Aided Positioning", 3GPP TSG RAN WG1 meeting #82, R1-153991, INTEL—D2D Trilateration, 3rd Generation Partnership Project, Mobile Competence Centre, 650, Route Des Lucioles, F-06921 Sophia-Antipolis Cedex, France, vol. RAN WG1, No. Beijing, China, Aug. 24, 2015-Aug. 28, 2015, pp. 1-6, Aug. 15, 2015, XP050993137, pp. 1,2.

Supplementary European Search Report—EP21957783—Search Authority—BERLIN—Aug. 6, 2025.

Supplementary Partial European Search Report—EP21957783—Search Authority—BERLIN—Apr. 29, 2025.

* cited by examiner

Model A Discovery

Model B Discovery

NETWORK-ASSISTED DISCOVERY FOR SIDELINK POSITIONING

CROSS-REFERENCE TO RELATED APPLICATIONS

The present application is a national stage application, filed under 35 U.S.C. § 371, of International Patent Application No. PCT/CN2021/119806, entitled, "NETWORK-ASSISTED DISCOVERY FOR SIDELINK POSITIONING", filed Sep. 23, 2021, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving an announcement message from each sidelink anchor device of one or more sidelink anchor devices, wherein the announcement message includes a sidelink anchor device identifier and an indication that the sidelink anchor device is available for positioning services; measuring the announcement message from each sidelink anchor device to determine a signal strength measurement associated with each sidelink anchor device; and reporting, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

In an aspect, a method of wireless communication performed by a sidelink anchor device includes receiving a solicitation message from each target user equipment (UE) of one or more target UEs, wherein the solicitation message received from each target UE includes a UE identifier; measuring the solicitation message received from each target UE to determine a signal strength measurement associated with each target UE; and reporting, to a network node, one or more UE identifiers of the one or more target UEs and the signal strength measurement associated with each target UE identified by the one or more UE identifiers.

In an aspect, a method of wireless communication performed by a network node includes sending a request to each sidelink anchor device of one or more sidelink anchor devices, wherein the request to each sidelink anchor device requests transmission of one or more positioning reference signals (PRS) by the sidelink anchor device; sending a request to a target UE requesting the target UE to measure the one or more PRS transmitted by the one or more sidelink anchor devices; and receiving, from the target UE, one or more PRS measurements taken by the target UE of the one or more PRS transmitted by the one or more sidelink anchor devices.

In an aspect, a method of wireless communication performed by a network node includes sending a request to a target UE to transmit one or more positioning reference signals (PRS); sending one or more requests to one or more sidelink anchor devices requesting the one or more sidelink anchor devices to measure the one or more PRS of the target UE; and receiving, from the one or more sidelink anchor devices, one or more PRS measurements taken by the one or more sidelink anchor devices of the one or more PRS of the target UE.

In an aspect, a user equipment (UE) includes a memory; at least one transceiver; and at least one processor communicatively coupled to the memory and the at least one transceiver, the at least one processor configured to: receive, via the at least one transceiver, an announcement message from each sidelink anchor device of one or more sidelink anchor devices, wherein the announcement message includes a sidelink anchor device identifier and an indication that the sidelink anchor device is available for positioning services; measure the announcement message from each sidelink anchor device to determine a signal strength measurement associated with each sidelink anchor device; and report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

In an aspect, a sidelink anchor device includes a memory; at least one transceiver; and at least one processor communicatively coupled to the memory and the at least one transceiver, the at least one processor configured to: receive, via the at least one transceiver, a solicitation message from each target user equipment (UE) of one or more target UEs, wherein the solicitation message received from each target UE includes a UE identifier; measure the solicitation message received from each target UE to determine a signal strength measurement associated with each target UE; and report, to a network node, one or more UE identifiers of the one or more target UEs and the signal strength measurement associated with each target UE identified by the one or more UE identifiers.

In an aspect, a network node includes a memory; at least one transceiver; and at least one processor communicatively coupled to the memory and the at least one transceiver, the at least one processor configured to: send, via the at least one transceiver, a request to each sidelink anchor device of one or more sidelink anchor devices, wherein the request to each sidelink anchor device requests transmission of one or more positioning reference signals (PRS) by the sidelink anchor device; send, via the at least one transceiver, a request to a target UE requesting the target UE to measure the one or more PRS transmitted by the one or more sidelink anchor devices; and receive, via the at least one transceiver, from the target UE, one or more PRS measurements taken by the target UE of the one or more PRS transmitted by the one or more sidelink anchor devices.

In an aspect, a network node includes a memory; at least one transceiver; and at least one processor communicatively coupled to the memory and the at least one transceiver, the at least one processor configured to: send, via the at least one transceiver, a request to a target UE to transmit one or more positioning reference signals (PRS); send, via the at least one transceiver, one or more requests to one or more sidelink anchor devices requesting the one or more sidelink anchor devices to measure the one or more PRS of the target UE; and receive, via the at least one transceiver, from the one or more sidelink anchor devices, one or more PRS measurements taken by the one or more sidelink anchor devices of the one or more PRS of the target UE.

In an aspect, a user equipment (UE) includes means for receiving an announcement message from each sidelink anchor device of one or more sidelink anchor devices, wherein the announcement message includes a sidelink anchor device identifier and an indication that the sidelink anchor device is available for positioning services; means for measuring the announcement message from each sidelink anchor device to determine a signal strength measurement associated with each sidelink anchor device; and means for reporting, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

In an aspect, a sidelink anchor device includes means for receiving a solicitation message from each target user equipment (UE) of one or more target UEs, wherein the solicitation message received from each target UE includes a UE identifier; means for measuring the solicitation message received from each target UE to determine a signal strength measurement associated with each target UE; and means for reporting, to a network node, one or more UE identifiers of the one or more target UEs and the signal strength measurement associated with each target UE identified by the one or more UE identifiers.

In an aspect, a network node includes means for sending a request to each sidelink anchor device of one or more sidelink anchor devices, wherein the request to each sidelink anchor device requests transmission of one or more positioning reference signals (PRS) by the sidelink anchor device; means for sending a request to a target UE requesting the target UE to measure the one or more PRS transmitted by the one or more sidelink anchor devices; and means for receiving, from the target UE, one or more PRS measurements taken by the target UE of the one or more PRS transmitted by the one or more sidelink anchor devices.

In an aspect, a network node includes means for sending a request to a target UE to transmit one or more positioning reference signals (PRS); means for sending one or more requests to one or more sidelink anchor devices requesting the one or more sidelink anchor devices to measure the one or more PRS of the target UE; and means for receiving, from the one or more sidelink anchor devices, one or more PRS measurements taken by the one or more sidelink anchor devices of the one or more PRS of the target UE.

In an aspect, a non-transitory computer-readable medium storing computer-executable instructions that, when executed by a user equipment (UE), cause the UE to: receive an announcement message from each sidelink anchor device of one or more sidelink anchor devices, wherein the announcement message includes a sidelink anchor device identifier and an indication that the sidelink anchor device is available for positioning services; measure the announcement message from each sidelink anchor device to determine a signal strength measurement associated with each sidelink anchor device; and report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

In an aspect, a non-transitory computer-readable medium storing computer-executable instructions that, when executed by a sidelink anchor device, cause the sidelink anchor device to: receive a solicitation message from each target user equipment (UE) of one or more target UEs, wherein the solicitation message received from each target UE includes a UE identifier; measure the solicitation message received from each target UE to determine a signal strength measurement associated with each target UE; and report, to a network node, one or more UE identifiers of the one or more target UEs and the signal strength measurement associated with each target UE identified by the one or more UE identifiers.

In an aspect, a non-transitory computer-readable medium storing computer-executable instructions that, when executed by a network node, cause the network node to: send a request to each sidelink anchor device of one or more sidelink anchor devices, wherein the request to each sidelink anchor device requests transmission of one or more positioning reference signals (PRS) by the sidelink anchor device; send a request to a target UE requesting the target UE to measure the one or more PRS transmitted by the one or more sidelink anchor devices; and receive, from the target UE, one or more PRS measurements taken by the target UE of the one or more PRS transmitted by the one or more sidelink anchor devices.

In an aspect, a non-transitory computer-readable medium storing computer-executable instructions that, when executed by a network node, cause the network node to: send a request to a target UE to transmit one or more positioning reference signals (PRS); send one or more requests to one or more sidelink anchor devices requesting the one or more sidelink anchor devices to measure the one or more PRS of the target UE; and receive, from the one or more sidelink anchor devices, one or more PRS measurements taken by the one or more sidelink anchor devices of the one or more PRS of the target UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
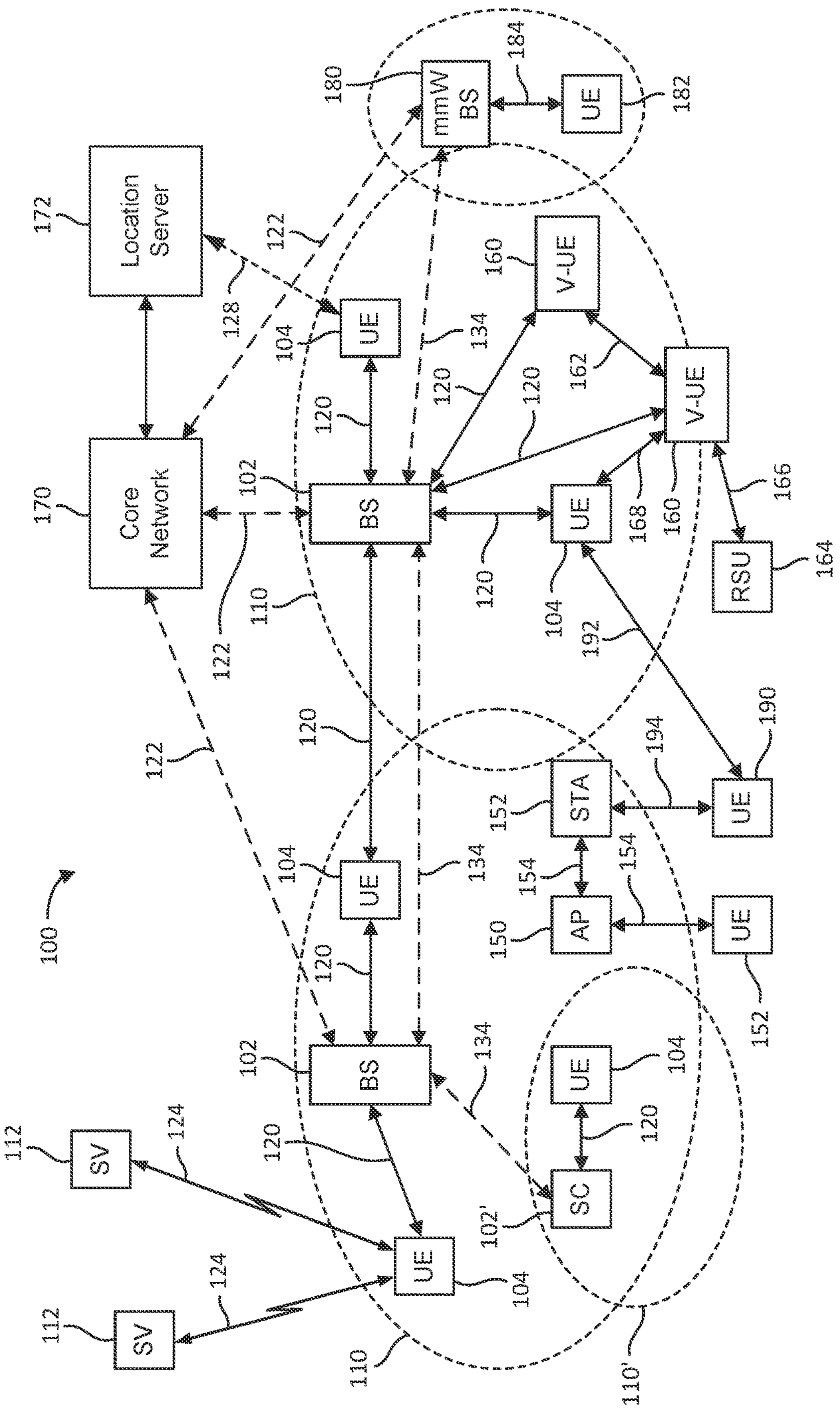
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally. UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace. RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if abase station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
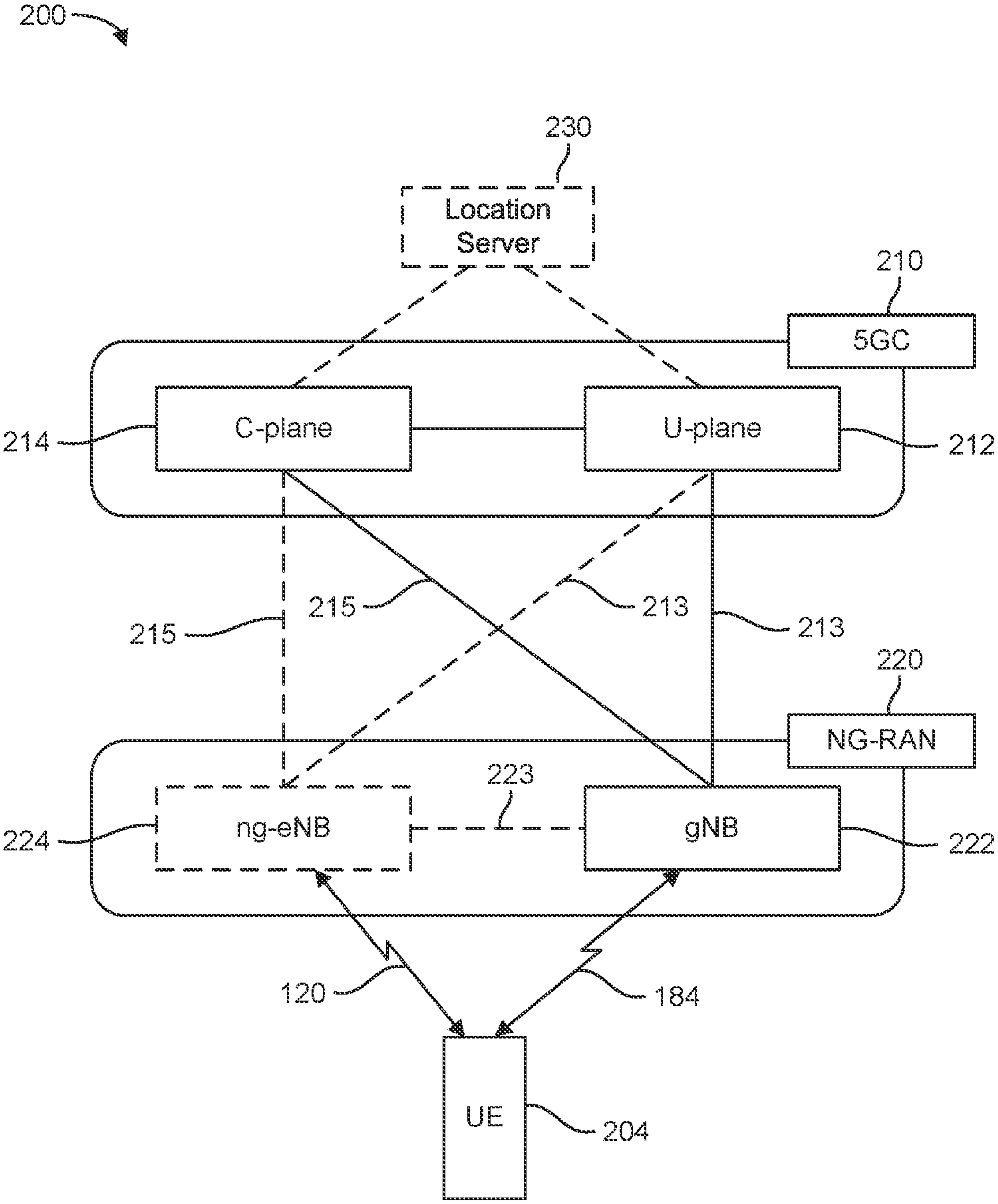
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
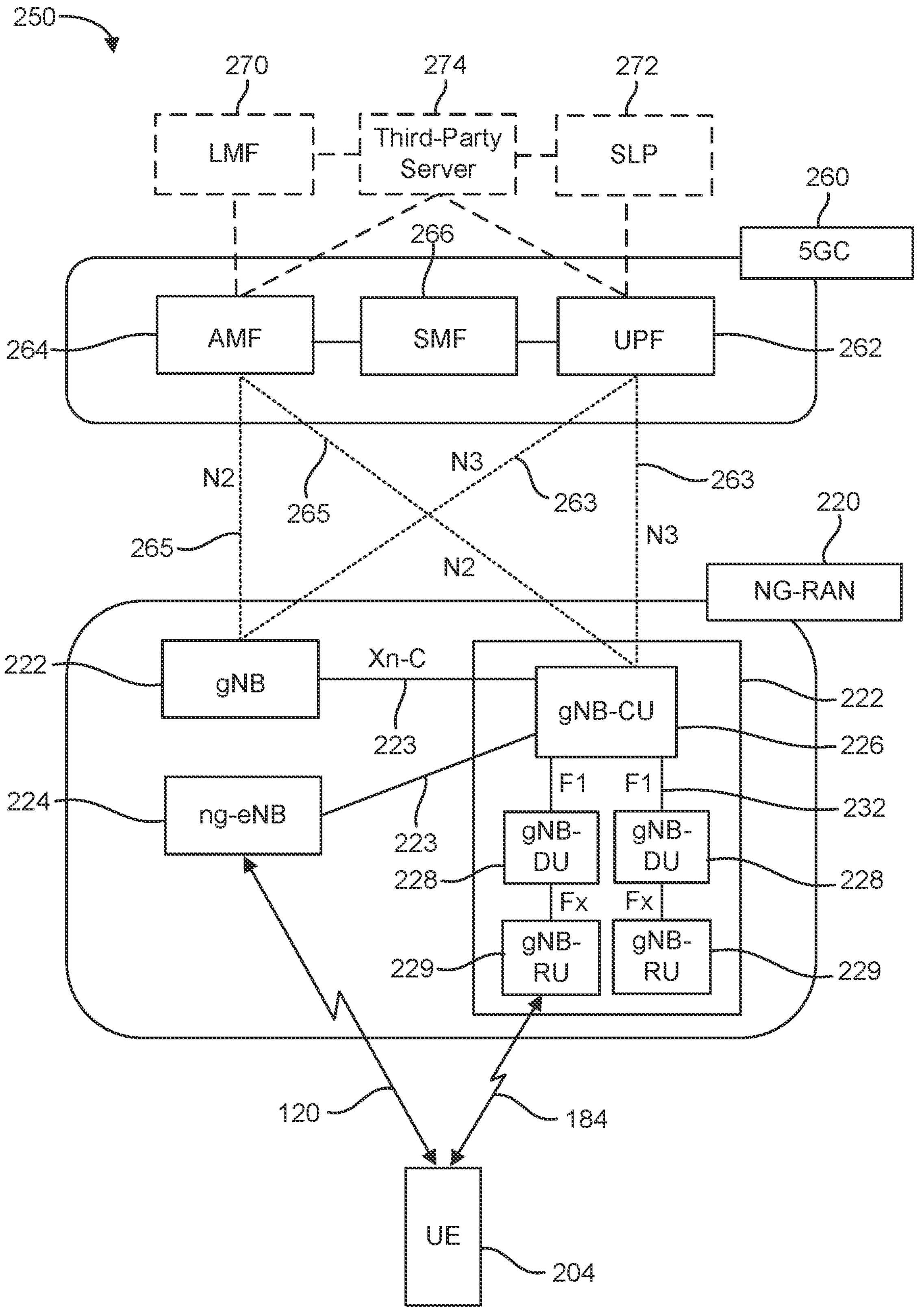

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
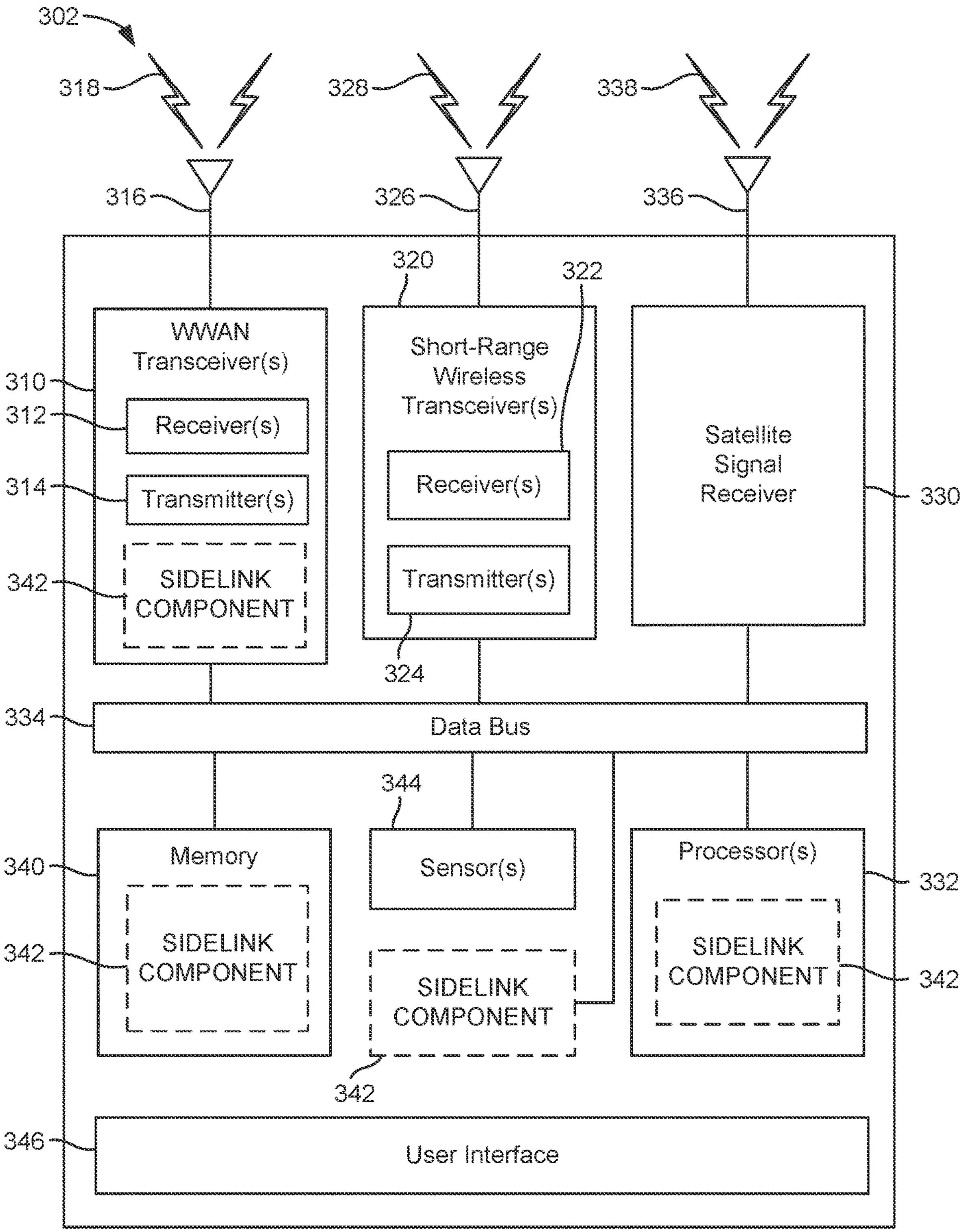
FIGS. 3A, 3B, and 3C are simplified block diagrams of several sample aspects of components that may be employed in a user equipment (UE), a base station, and a network entity, respectively, and configured to support communications as taught herein.
Figure 3B:
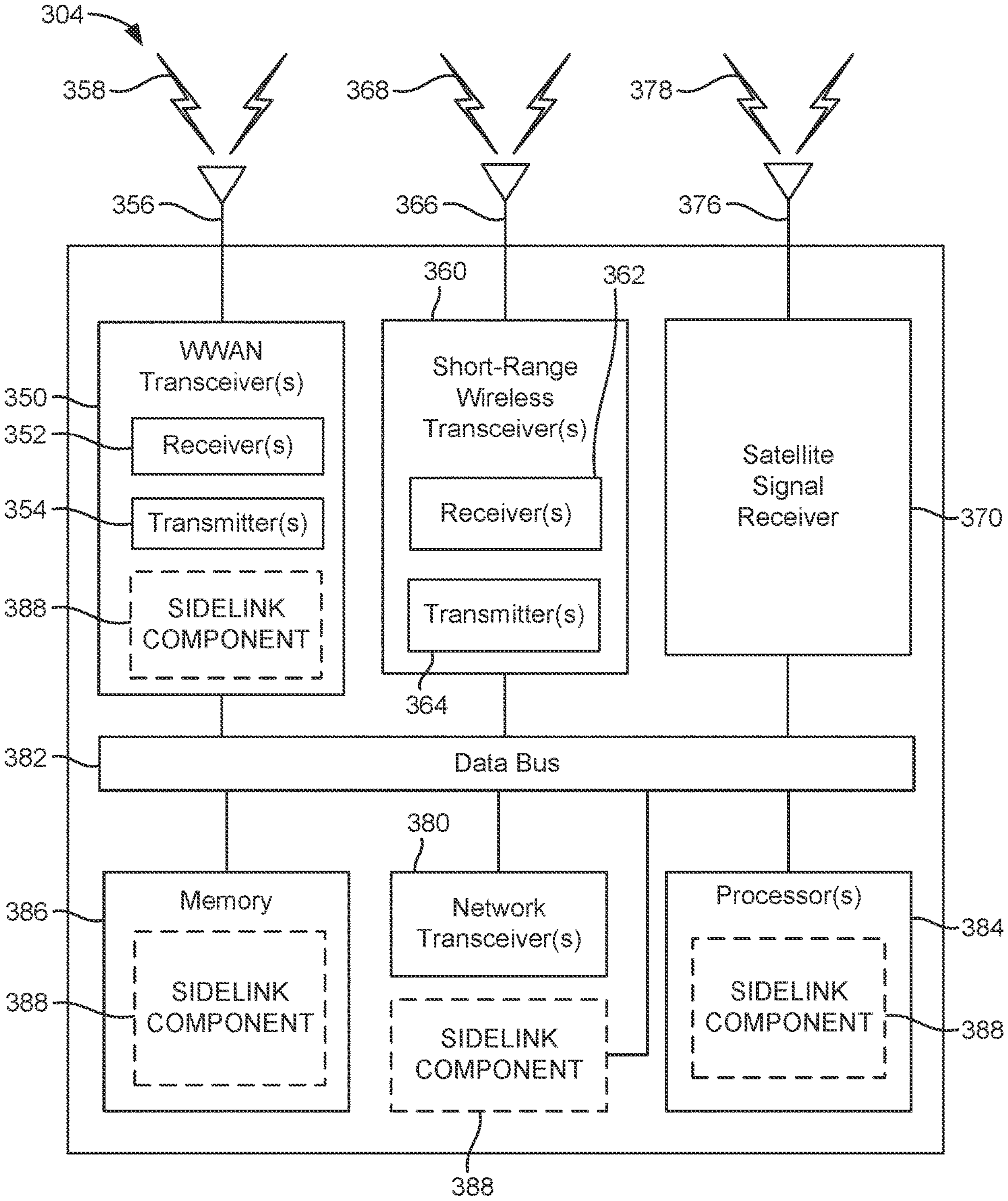
Figure 3C:
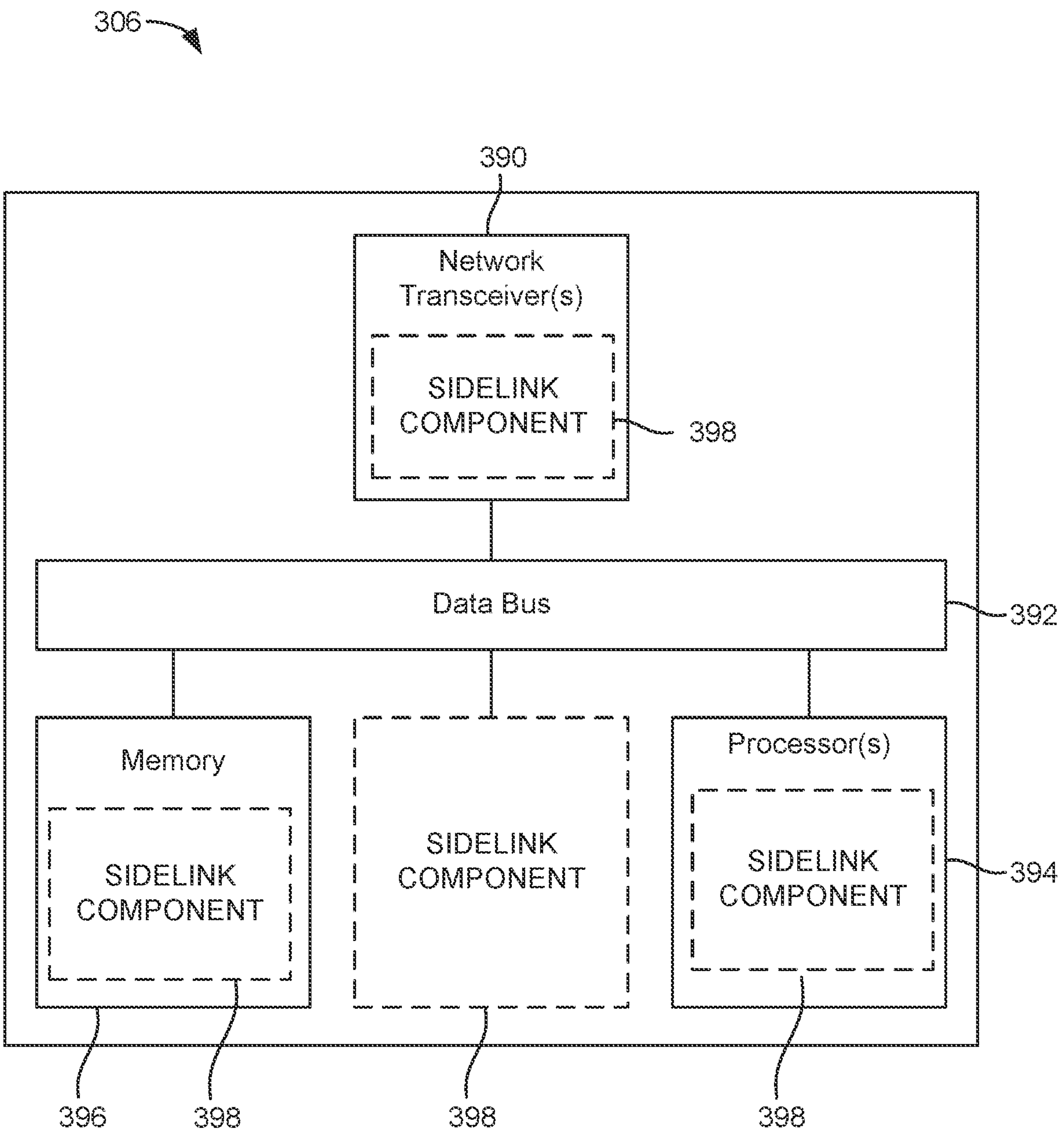

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR. LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316. 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink component 342, 388, and 398, respectively. The sidelink component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink component 342, 388, and 398 may be external to the processors 332, 384, and 394 (e.g., part of a modem processing system, integrated with another processing system, etc.). Alternatively, the sidelink component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink component 342, which may be, for example, part of the one or more WWAN transceivers 310, the memory 340, the one or more processors 332, or any combination thereof, or may be a standalone component. FIG. 3B illustrates possible locations of the sidelink component 388, which may be, for example, part of the one or more WWAN transceivers 350, the memory 386, the one or more processors 384, or any combination thereof, or may be a standalone component. FIG. 3C illustrates possible locations of the sidelink component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs. and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
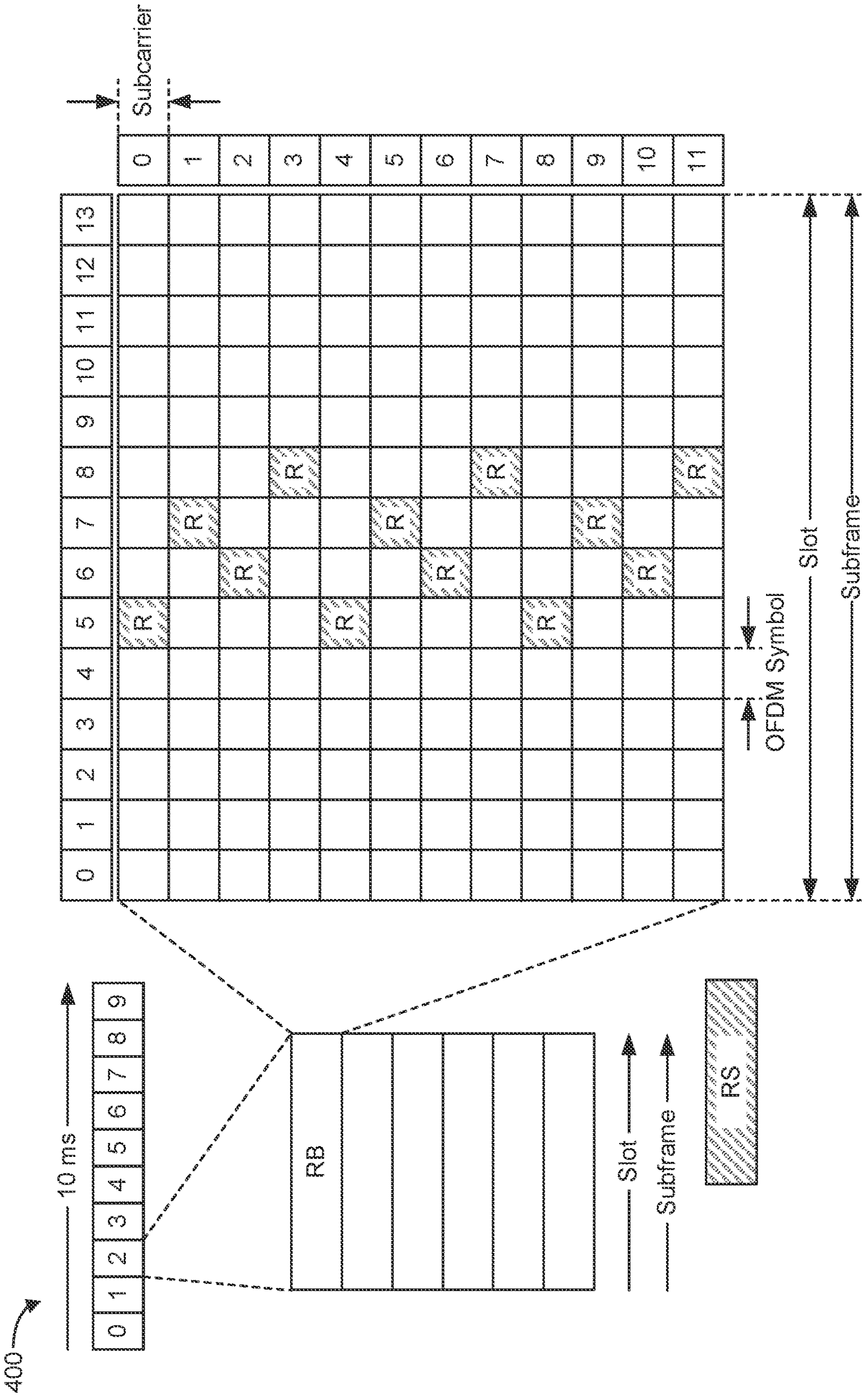
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration. REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}, and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu=0$, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In NR, there may not be precise timing synchronization across the network. Instead, it may be sufficient to have coarse time-synchronization across base stations (e.g., within a cyclic prefix (CP) duration of the orthogonal frequency division multiplexing (OFDM) symbols). RTT-based methods generally only need coarse timing synchronization, and as such, are a preferred positioning method in NR.

Figure 5:
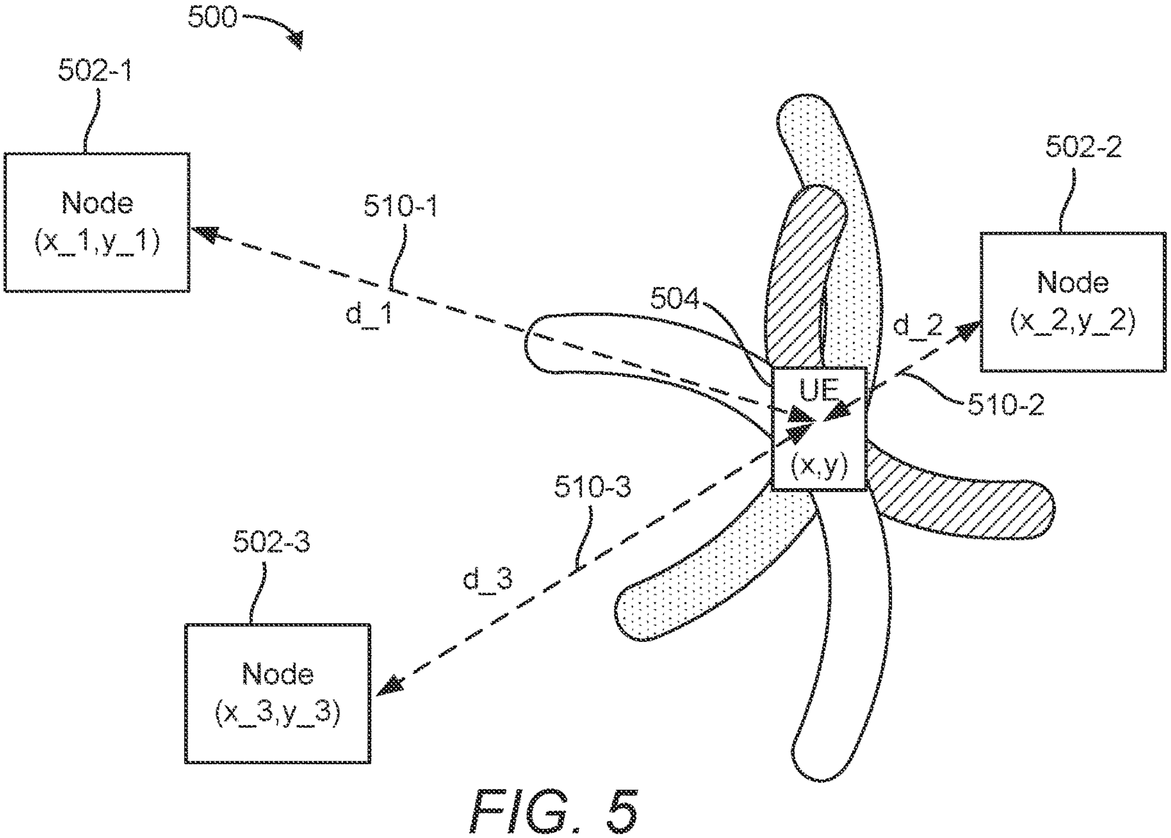
FIG. 5 is a diagram illustrating an example round-trip-time (RTT) procedure for determining a location of a UE, according to aspects of the disclosure.

FIG. 5 illustrates an example wireless communications system 500, according to aspects of the disclosure. In the example of FIG. 5, a UE 504 (e.g., any of the UEs described herein) is attempting to calculate an estimate of its location, or assist another entity (e.g., a base station or core network component, another UE, a location server, a third party application, etc.) to calculate an estimate of its location. The UE 504 may transmit and receive wireless signals to and from a plurality of network nodes (labeled "Node") 502-1, 502-2, and 502-3 (collectively, network nodes 502). The network nodes 502 may include one or more base stations (e.g., any of the base stations described herein), one or more reconfigurable intelligent displays (RIS), one or more positioning beacons, one or more UEs (e.g., connected over sidelinks), etc.

In a network-centric RTT positioning procedure the serving base station (e.g., one of network nodes 502) instructs the UE 504 to measure RTT measurement signals (e.g., PRS) from two or more neighboring network nodes 502 (and typically the serving base station, as at least three network nodes 502 are needed for a two-dimensional location estimate). The involved network nodes 502 transmit RTT measurement signals on low reuse resources (e.g., resources used by the network nodes 502 to transmit system information, where the network nodes 502 are base stations) allocated by the network (e.g., location server 230, LMF 270, SLP 272). The UE 504 records the arrival time (also referred to as the receive time, reception time, time of reception, or time of arrival) of each RTT measurement signal relative to the UE's 504 current downlink timing (e.g., as derived by the UE 504 from a downlink signal received from its serving base station), and transmits a common or individual RTT response signal (e.g., SRS) to the involved network nodes 502 on resources allocated by its serving base station. The UE 504, if it not the positioning entity, reports a UE reception-to-transmission (Rx-Tx) time difference measurement to the positioning entity. The UE Rx-Tx time difference measurement indicates the time difference between the arrival time of each RTT measurement signal at the UE 504 and the transmission time(s) of the RTT response signal(s). Each involved network node 502 also reports, to the positioning entity, a network node Rx-Tx time difference measurement (also referred to as a base station (BS) or gNB Rx-Tx time difference measurement), which indicates the difference between the transmission time of the RTT measurement signal and the reception time of the RTT response signal.

A UE-centric RTT positioning procedure is similar to the network-based procedure, except that the UE 504 transmits uplink RTT measurement signal(s) (e.g., on resources allocated by the serving base station). The uplink RTT measurement signal(s) are measured by multiple network nodes 502 in the neighborhood of the UE 504. Each involved network node 502 responds with a downlink RTT response signal and reports a network node Rx-Tx time difference measurement to the positioning entity. The network node Rx-Tx time difference measurement indicates the time difference between the arrival time of the RTT measurement signal at the network node 502 and the transmission time of the RTT response signal. The UE 504, if it is not the positioning entity, reports, for each network node 502, a UE Rx-Tx time difference measurement that indicates the difference between the transmission time of the RTT measurement signal and the reception time of the RTT response signal.

In order to determine the location (x, y) of the UE 504, the positioning entity needs to know the locations of the network nodes 502, which may be represented in a reference coordinate system as (x_k, y_y), where k=1, 2, 3 in the example of FIG. 5. Where the UE 504 is the positioning entity, a location server with knowledge of the network geometry (e.g., location server 230, LMF 270, SLP 272) may provide the locations of the involved network nodes 502 to the UE 504.

The positioning entity determines each distance 510 (d_k, where k=1, 2, 3) between the UE 504 and the respective network node 502 based on the UE Rx-Tx and network node Rx-Tx time difference measurements and the speed of light, as described further below with reference to FIG. 6. Specifically, in the example of FIG. 5, the distance 510-1 between the UE 504 and the network node 502-1 is d_1, the distance 510-2 between the UE 504 and the network node 502-2 is d_2, and the distance 510-3 between the UE 504 and the network node 502-3 is d_3. Once each distance 510 is determined, the positioning entity can solve for the location (x, y) of the UE 504 by using a variety of known geometric techniques, such as trilateration. From FIG. 5, it can be seen that the location of the UE 504 ideally lies at the common intersection of three semicircles, each semicircle being defined by radius dk and center (x_k, y_k), where k=1, 2, 3.

Figure 6:
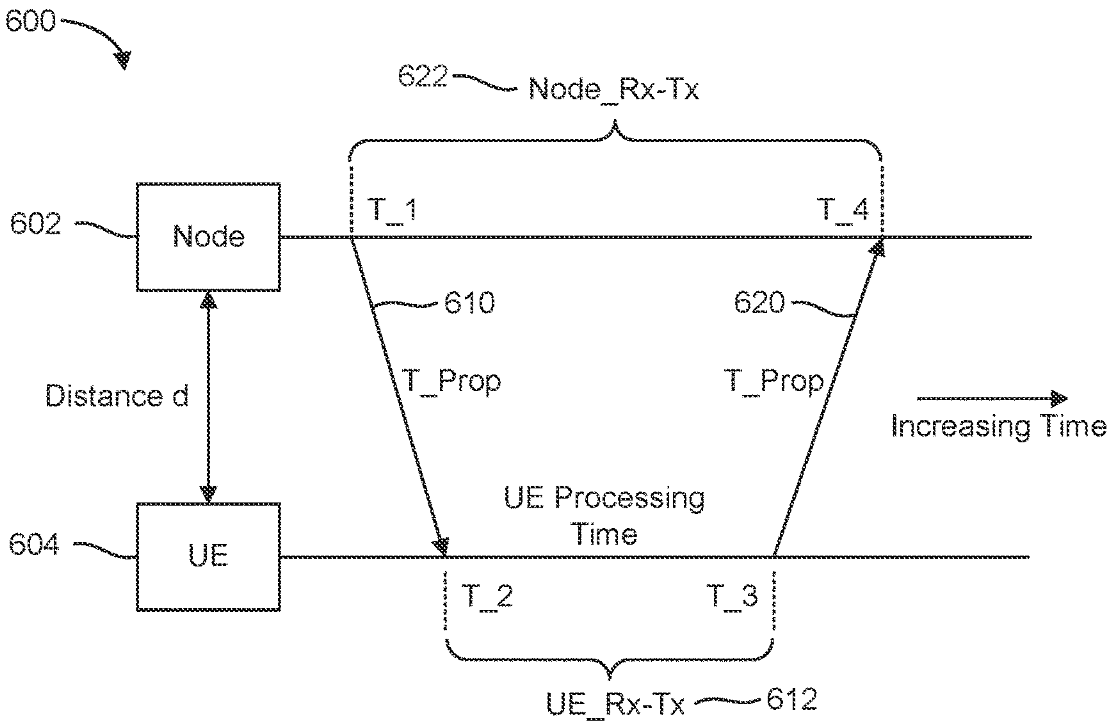
FIG. 6 is a diagram showing example timings of RTT measurement signals exchanged between a base station and a UE, according to aspects of the disclosure.

FIG. 6 is a diagram 600 showing example timings of RTT measurement signals exchanged between a network node 602 (labeled "Node") and a UE 604, according to aspects of the disclosure. The UE 604 may be any of the UEs described herein. The network node 602 may be a base station (e.g., any of the base stations described herein), an RIS, a positioning beacon, another UE (e.g., connected over a sidelink), or the like.

In the example of FIG. 6, the network node 602 (labeled "BS") sends an RTT measurement signal 610 (e.g., PRS) to the UE 604 at time T_1. The RTT measurement signal 610 has some propagation delay T_Prop as it travels from the network node 602 to the UE 604. At time T_2 (the reception time of the RTT measurement signal 610 at the UE 604), the UE 604 measures the RTT measurement signal 610. After some UE processing time, the UE 604 transmits an RTT response signal 620 (e.g., SRS) at time T_3. After the propagation delay T_Prop, the network node 602 measures the RTT response signal 620 from the UE 604 at time T_4 (the reception time of the RTT response signal 620 at the network node 602).

The UE 604 reports the difference between time T_3 and time T_2 (i.e., the UE's 604 Rx-Tx time difference measurement, shown as UE_Rx-Tx 612) to the positioning entity. Similarly, the network node 602 reports the difference between time T_4 and time T_1 (i.e., the network node's 602 Rx-Tx time difference measurement, shown as Node_Rx-Tx 622) to the positioning entity. Using these measurements and the known speed of light, the positioning entity can calculate the distance to the UE 604 as d=½*c*(Node_Rx-Tx−UE_Rx-Tx)=½*c*(T_4−T_1)−½*c*(T_3−T_2), where c is the speed of light.

Based on the known location of the network node 602 and the distance between the UE 604 and the network node 602 (and at least two other network nodes 602), the positioning entity can calculate the location of the UE 604. As shown in FIG. 5, the location of the UE 604 lies at the common intersection of three semicircles, each semicircle being defined by a radius of the distance between the UE 604 and a respective network node 602.

In an aspect, the positioning entity may calculate the UE's 504/604 location using a two-dimensional coordinate system; however, the aspects disclosed herein are not so limited, and may also be applicable to determining locations using a three-dimensional coordinate system, if the extra dimension is desired. Additionally, while FIG. 5 illustrates one UE 504 and three network nodes 502 and FIG. 6 illustrates one UE 604 and one network node 602, as will be appreciated, there may be more UEs 504/604 and more network nodes 502/602.

Figure 7:
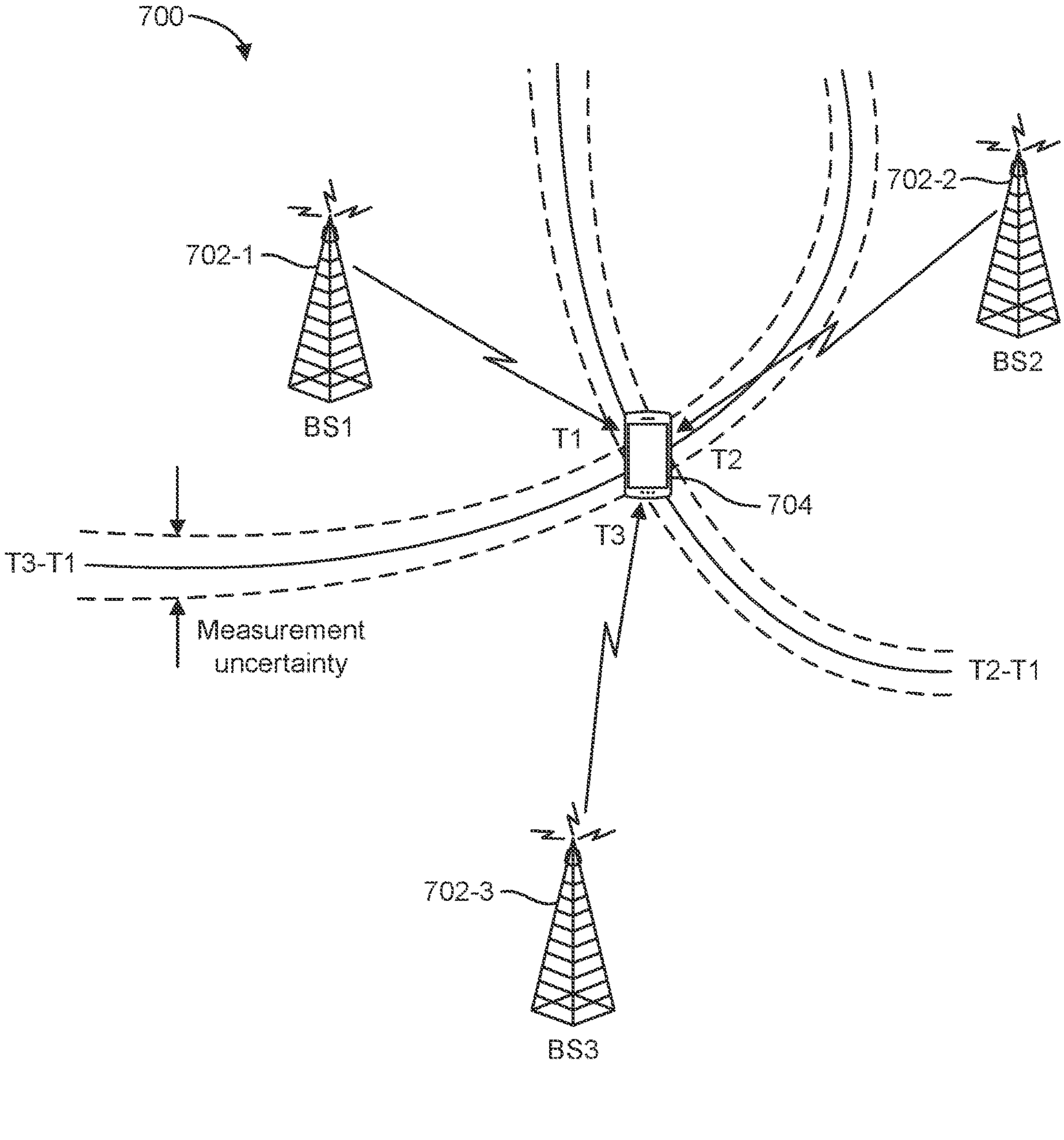
FIG. 7 illustrates a time difference of arrival (TDOA)-based positioning procedure in an example wireless communications system, according to aspects of the disclosure.

FIG. 7 illustrates a time difference of arrival (TDOA)-based positioning procedure in an example wireless communications system 700, according to aspects of the disclosure. The TDOA-based positioning procedure may be an observed time difference of arrival (OTDOA) positioning procedure, as in LTE, or a downlink time difference of arrival (DL-TDOA) positioning procedure, as in 5G NR. In the example of FIG. 7, a UE 704 (e.g., any of the UEs described herein) is attempting to calculate an estimate of its location (referred to as "UE-based" positioning), or assist another entity (e.g., a base station or core network component, another UE, a location server, a third party application, etc.) to calculate an estimate of its location (referred to as "UE-assisted" positioning). The UE 704 may communicate with (e.g., send information to and receive information from) one or more of a plurality of base stations 702 (e.g., any combination of base stations described herein), labeled "BS1" 702-1, "BS2" 702-2, and "BS3" 702-3.

To support location estimates, the base stations 702 may be configured to broadcast positioning reference signals (e.g., PRS, TRS, CRS, CSI-RS, etc.) to a UE 704 in their coverage areas to enable the UE 704 to measure characteristics of such reference signals. In a TDOA-based positioning procedure, the UE 704 measures the time difference, known as the reference signal time difference (RSTD) or TDOA, between specific downlink reference signals (e.g., PRS. TRS, CRS, CSI-RS, etc.) transmitted by different pairs of base stations 702, and either reports these RSTD measurements to a location server (e.g., location server 230, LMF 270, SLP 272) or computes a location estimate itself from the RSTD measurements.

Generally, RSTDs are measured between a reference cell (e.g., a cell supported by base station 702-1 in the example of FIG. 7) and one or more neighbor cells (e.g., cells supported by base stations 702-2 and 702-3 in the example of FIG. 7). The reference cell remains the same for all RSTDs measured by the UE 704 for any single positioning use of TDOA and would typically correspond to the serving cell for the UE 704 or another nearby cell with good signal strength at the UE 704. In an aspect, the neighbor cells would normally be cells supported by base stations different from the base station for the reference cell, and may have good or poor signal strength at the UE 704. The location computation can be based on the measured RSTDs and knowledge of the involved base stations' 702 locations and relative transmission timing (e.g., regarding whether base stations 702 are accurately synchronized or whether each base station 702 transmits with some known time offset relative to other base stations 702).

To assist TDOA-based positioning operations, the location server (e.g., location server 230, LMF 270, SLP 272) may provide assistance data to the UE 704 for the reference cell and the neighbor cells relative to the reference cell. For example, the assistance data may include identifiers (e.g., PCI, VCI, CGI, etc.) for each cell of a set of cells that the UE 704 is expected to measure (here, cells supported by the base stations 702). The assistance data may also provide the center channel frequency of each cell, various reference signal configuration parameters (e.g., the number of consecutive positioning slots, periodicity of positioning slots, muting sequence, frequency hopping sequence, reference signal identifier, reference signal bandwidth), and/or other cell related parameters applicable to TDOA-based positioning procedures. The assistance data may also indicate the serving cell for the UE 704 as the reference cell.

In some cases, the assistance data may also include "expected RSTD" parameters, which provide the UE 704 with information about the RSTD values the UE 704 is expected to measure between the reference cell and each neighbor cell at its current location, together with an uncertainty of the expected RSTD parameter. The expected RSTD, together with the associated uncertainty, may define a search window for the UE 704 within which the UE 704 is expected to measure the RSTD value. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

TDOA assistance information may also include positioning reference signal configuration information parameters, which allow the UE 704 to determine when a positioning reference signal occasion will occur on signals received from various neighbor cells relative to positioning reference signal occasions for the reference cell, and to determine the reference signal sequence transmitted from the various cells in order to measure a reference signal time of arrival (ToA) or RSTD.

In an aspect, while the location server (e.g., location server 230, LMF 270, SLP 272) may send the assistance data to the UE 704, alternatively, the assistance data can originate directly from the base stations 702 themselves (e.g., in periodically broadcasted overhead messages, etc.). Alternatively, the UE 704 can detect neighbor base stations itself without the use of assistance data.

The UE 704 (e.g., based in part on the assistance data, if provided) can measure and (optionally) report the RSTDs between reference signals received from pairs of base stations 702. Using the RSTD measurements, the known absolute or relative transmission timing of each base station 702, and the known location(s) of the reference and neighbor base stations 702, the network (e.g., location server 230/LMF 270/SLP 272, a base station 702) or the UE 704 can estimate the location of the UE 704. More particularly, the RSTD for a neighbor cell "k" relative to a reference cell "Ref" may be given as (ToA_k−ToA_Ref). In the example of FIG. 7, the measured RSTDs between the reference cell of base station 702-1 and the cells of neighbor base stations 702-2 and 702-3 may be represented as T2−T1 and T3−T1, where T1, T2, and T3 represent the ToA of a reference signal from the base station 702-1, 702-2, and 702-3, respectively. The UE 704 (if it is not the positioning entity) may then send the RSTD measurements to the location server or other positioning entity. Using (i) the RSTD measurements, (ii) the known absolute or relative transmission timing of each base station 702, (iii) the known location(s) of the base stations 702, and/or (iv) directional reference signal characteristics, such as the direction of transmission, the UE's 704 location may be determined (either by the UE 704 or the location server).

In an aspect, the location estimate may specify the location of the UE 704 in a two-dimensional (2D) coordinate system; however, the aspects disclosed herein are not so limited, and may also be applicable to determining location estimates using a three-dimensional (3D) coordinate system, if the extra dimension is desired. Additionally, while FIG. 7 illustrates one UE 704 and three base stations 702, as will be appreciated, there may be more UEs 704 and more base stations 702.

Still referring to FIG. 7, when the UE 704 obtains a location estimate using RSTDs, the necessary additional data (e.g., the base stations' 702 locations and relative transmission timing) may be provided to the UE 704 by the location server. In some implementations, a location estimate for the UE 704 may be obtained (e.g., by the UE 704 itself or by the location server) from RSTDs and from other measurements made by the UE 704 (e.g., measurements of signal timing from global positioning system (GPS) or other global navigation satellite system (GNSS) satellites). In these implementations, known as hybrid positioning, the RSTD measurements may contribute towards obtaining the UE's 704 location estimate but may not wholly determine the location estimate.

Proximity services (referred to as "ProSe") have been introduced in LTE and 5G. ProSe is a D2D technology that allows ProSe-enabled UEs to "discover" each other and to communicate with each other directly (e.g., over a sidelink or via the same serving base station). For example, UE 190 and UE 104 in FIG. 1 may be examples of ProSe-enabled UEs. ProSe Direct Discovery procedures identify ProSe-enabled UEs that are in proximity to each another. ProSe Direct Communication procedures enable the establishment of communication paths between two or more ProSe-enabled UEs that are in direct wireless communication range. The ProSe Direct Communication path may be through the RAN (e.g., a shared serving base station) or over a unicast sidelink (e.g., sidelinks 192, 194) between the involved UEs.

Figure 8A:
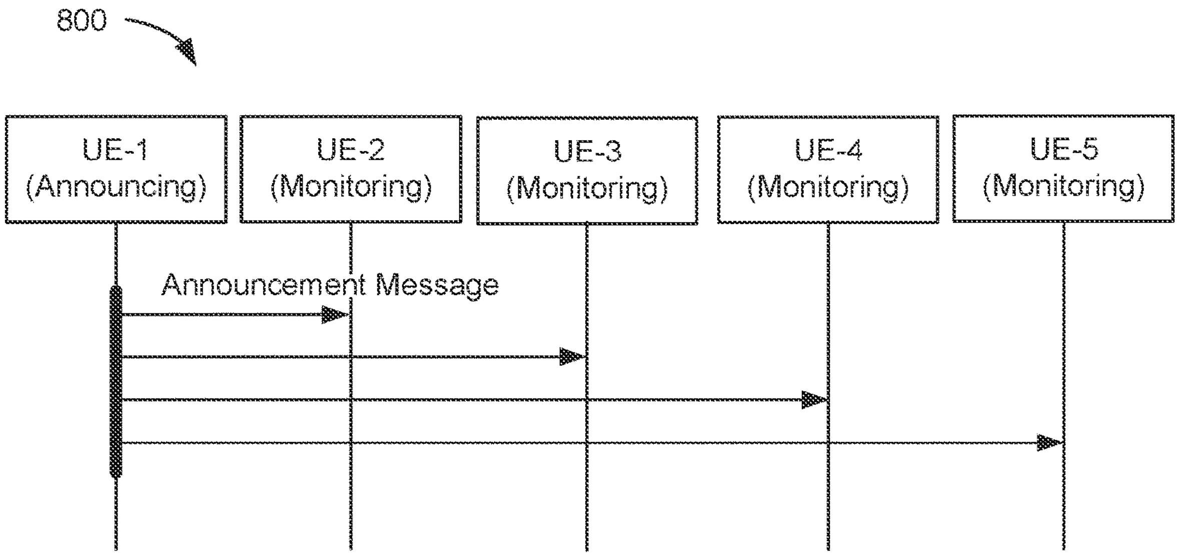
FIG. 8A illustrates an example call flow for Model A discovery.
Figure 8B:
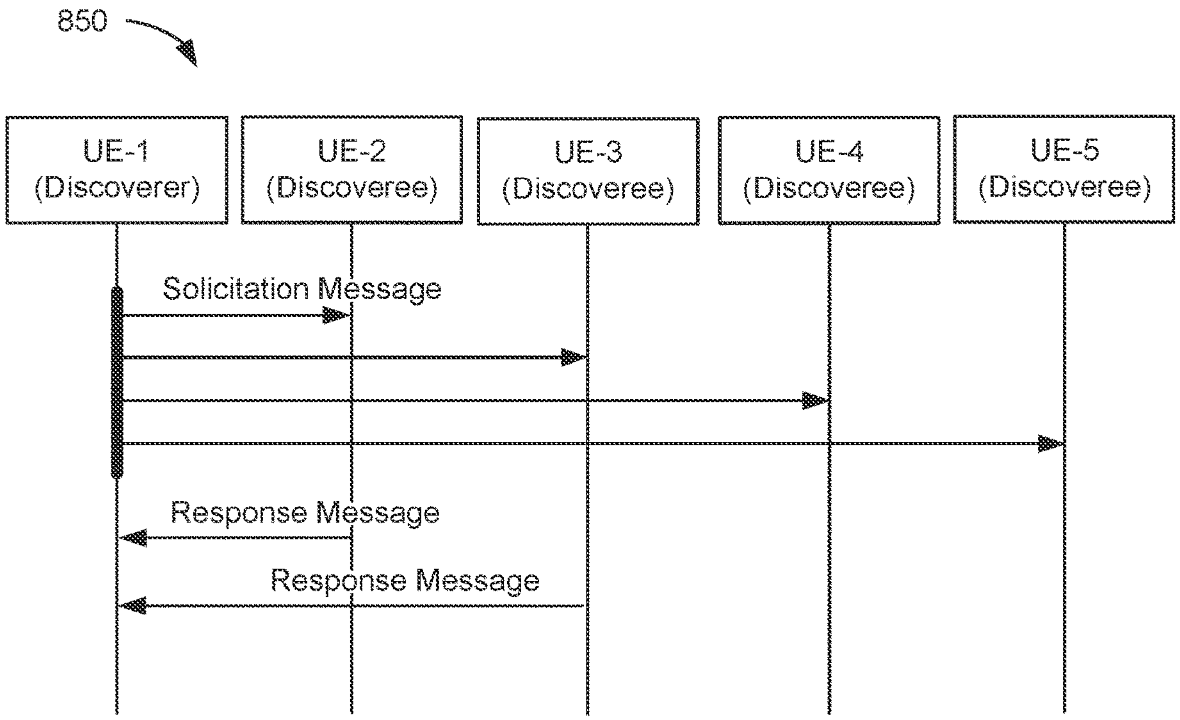
FIG. 8B illustrates an example call flow for Model B discovery.

5G supports two types of ProSe Direct Discovery procedures, "Model A" and "Model B." These Direct Discovery procedures are defined in 3GPP Technical Report (TR) 23.752, which is publicly available and incorporated by reference herein in its entirety. FIG. 8A illustrates an example call flow 800 for Model A discovery, and FIG. 8B illustrates an example call flow 850 for Model B discovery. As illustrated in FIG. 8A, for Model A discovery, an announcing UE (labeled "UE-1") sends announcement messages to one or more monitoring UEs (labeled "UE-2," "UE-3," "UE-4," and "UE-5"). For a relay scenario, UE-1 is a relay UE (having Uu connection to gNB) and UE-2 is a remote UE. In contrast, as illustrated in FIG. 8B, a discoverer UE (labeled "UE-1") sends a solicitation message to one or more discoveree UEs (labeled "UE-2," "UE-3," "UE-4," and "UE-5"). Discoveree UEs ("UE-2" and "UE-3" in the example of FIG. 8B) interested in establishing a sidelink with the discoverer UE respond to the solicitation message with a response message. For a relay scenario, UE-1 is a remote UE and UE-2 (having Uu connection to gNB) is a relay UE.

Figure 9:
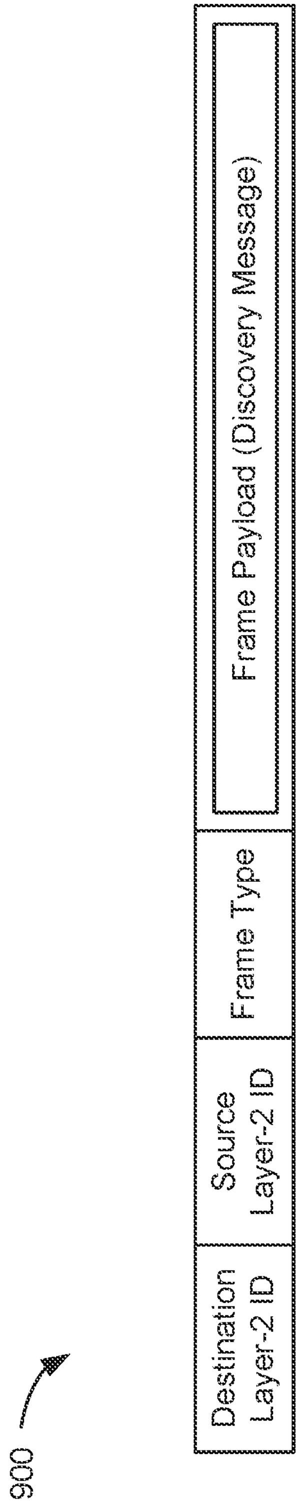
FIG. 9 is a diagram of a simplified Layer-2 frame format for ProSe Direct Discovery messages.

The discovery messages (whether announcement messages or solicitation messages) are sent over a PC5 communication channel and not over a separate discovery channel. Discovery messages may be carried within the same Layer-2 frames as those used for ProSe Direct Communication. FIG. 9 is a diagram 900 of a simplified Layer-2 frame format for ProSe Direct Discovery messages. The "Destination Layer-2 ID" field can be set to a unicast, groupcast, or broadcast identifier. The "Source Layer-2 ID" field is set to a unicast identifier of the transmitter (e.g., "UE-1" in FIGS. 8A and 8B). The "Frame Type" field indicates that it is a ProSe Direct Discovery message.

There are two options for sidelink groupcast supported in the 3GPP standards. Option 1 is a groupcast with NACK only HARQ feedback. In option 1, all receiving UEs may share the same physical sidelink feedback channel (PSFCH) resource for NACK. Distance-based HARQ feedback can also be enabled for the groupcast option 1. Option 2 is a groupcast with ACK or NACK HARQ feedback. In option 2, each receiving UE uses a separate PSFCH resource for ACK/NACK.

There are two SCI-2 formats supported for different HARQ operations. The SCI format 2-A supports HARQ operation with ACK/NACK feedback, NACK only feedback, or no HARQ feedback. The groupcast type is indicated in the cast type field of SCI format 2-A. The SCI format 2-B is only used for HARQ operation with the feedback being NACK only, or no HARQ feedback. The SCI format 2-B does not indicate cast type and is only used for broadcast, or groupcast option 1. Table 1 shows examples of the value cast type indicator and cast type details of SCI format 2-A.

TABLE 1

| Value of Cast type indicator | Cast Type |
|---|---|
| 00 | Broadcast |
| 01 | Groupcast (option 2) when HARQ-ACK information includes ACK or NACK |
| 10 | Unicast |
| 11 | Groupcast (option 1) when HARQ-ACK information includes NACK only |

The addition of sidelink positioning functionality has been proposed for inclusion in 3GPP standards. In accordance with such proposals, sidelink positioning operations between multiple UEs occur independent of whether the UEs are connected to a network. By operating independent of network control, a UE may engage in positioning operations with sidelink UEs without first establishing a connection with the network. Such direct sidelink positioning without network mediation introduces the possibility of obtaining lower latency positioning measurements.

Sidelink positioning may be absolute in that the location of the UE is reported and/or determined based on its exact place on Earth, often given in terms of latitude and longitude. Absolute location positioning requires a substantial amount of data and processing power for accurate positioning determinations. Sidelink positioning can also be based on relative positioning. In relative positioning, the location of the UE is reported relative to its position with respect to other UEs.

There are numerous use cases for relative sidelink positioning, including those involving indoor positioning environments. Such use cases may include 1) public safety e.g., firefighters tracking each other, 2) vehicle applications like platooning, or collision avoidance (e.g., for lane merging), 3) unmanned aerial vehicle (UAV) applications (e.g., when approaching a docking station), 4) AR (augmented reality) use cases (e.g., multiple users interacting with each other in an AR application), 5) Smart home entertainment applications (e.g., contents from smart phone played on TV).

Indoor sidelink positioning may use relative positioning where the position of a target UE (i.e., a UE whose position is to be determined) may be determined relative to one or more sidelink anchor devices (i.e., UE anchors) operating as deployed/fixed beacons in the positioning environment. Deployment of multiple UE anchors provides the potential for abundant LOS paths between the target UE and UE anchors deployed in the positioning environment.

Certain aspects of the disclosure recognize that it may be impractical for anchor UEs to provide positioning services to the target UE on a continuous basis. However, certain aspects of the disclosed system are implemented with a recognition that any need for continuous provision of positioning services by anchor UEs may be mitigated, at least in part, by allowing a network to engage the target UEs and/or anchor UEs in positioning operations in environments where network coverage is generally not an issue. In an aspect, the network may assist in sidelink resource discovery to facilitate an initial identification and configuration of target UEs and/or anchor UEs in the positioning environment. In a further aspect, the network may facilitate use of identified sidelink resources in sidelink positioning operations.

Figure 10:
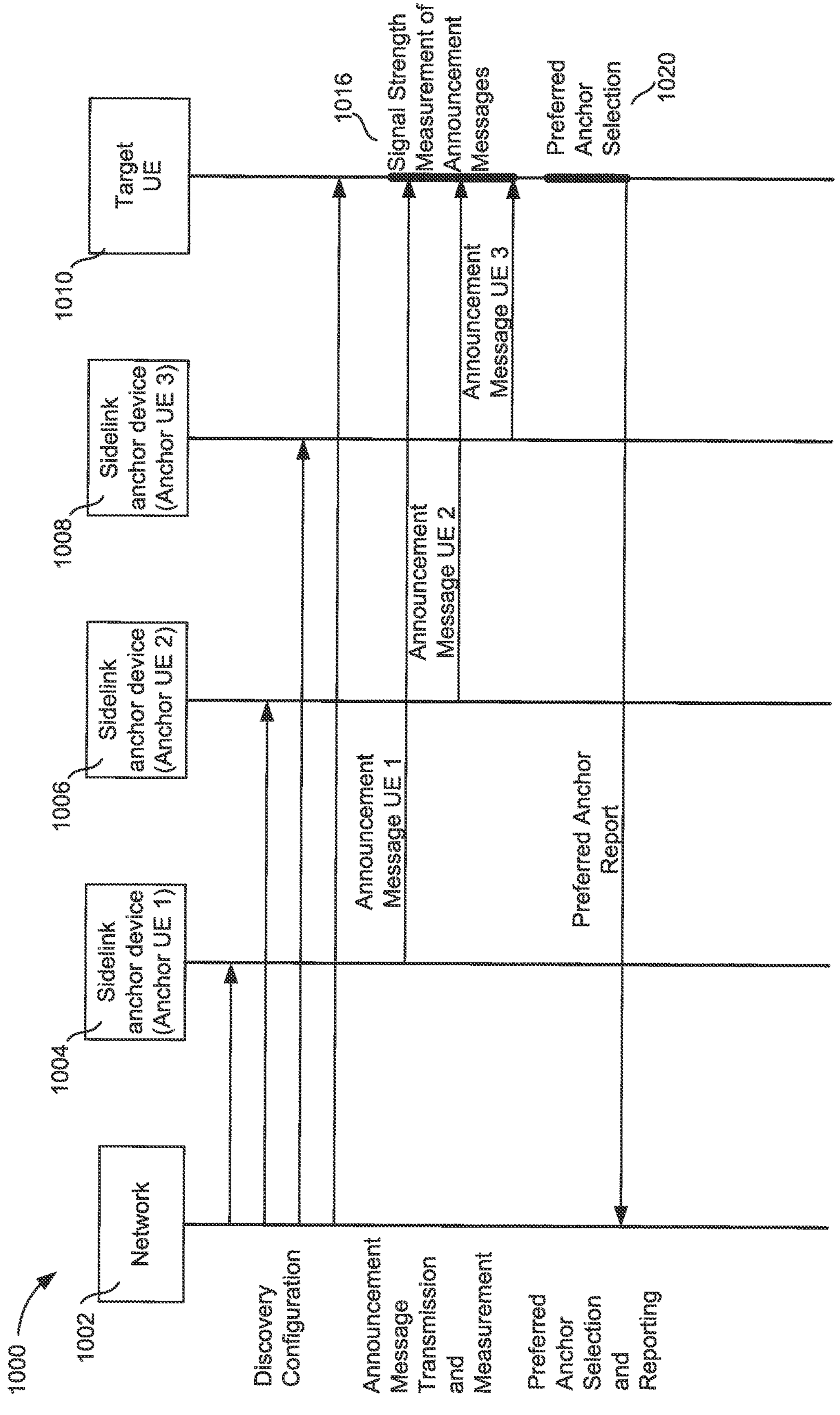
FIG. 10 illustrates an example call flow that may be employed in sidelink device discovery operations in accordance with certain aspects of the disclosure.

FIG. 10 illustrates an example call flow 1000 that may be employed in sidelink device discovery operations in accordance with certain aspects of the disclosure. In this example, the call flow 1000 involves a network 1002 (e.g., a LMF (location management function) from core network, or a gNB, RAN, or the like) a target UE 1010 (labeled "Target UE"), and three sidelink anchor devices 1004, 1006, and 1008 (respectively labeled "Anchor UE 1," "Anchor UE 2," and "Anchor UE 3"). Based on the teachings of the disclosure, it will be recognized that the call flow 1000 shown in FIG. 10 may be extended to positioning environments having a larger number of anchor UEs and target UEs than shown in FIG. 10. The positioning environment in which call flow 1000 is shown constitutes a non-limiting example.

During a discovery configuration stage of the call flow 1000, the network 1002 configures and/or indicates sidelink anchor devices 1004, 1006, and 1008 with transmission resources in a sidelink discovery resource pool to broadcast respective announcement messages in a manner similar to Discovery Model A. Additionally, or in the alternative, network 1002 may configure and/or indicate target UE 1010 with reception discovery resources that are used to monitor for transmissions within the positioning environment.

Once network 1002 has configured the discovery pool resources, each sidelink anchor device 1004, 1006, and 1008 transmits a corresponding announcement message. The sidelink anchor devices 1004, 1006, and 1008 periodically broadcast the announcement message for their positioning services as anchor devices in the sidelink discovery resource pool.

Each announcement message includes a sidelink anchor device identifier and an indication that the sidelink anchor device is available for positioning services. In this example, sidelink anchor device 1004 transmits an announcement message (labeled "Announcement Message UE 1"), which includes a sidelink anchor device identifier indicating that Announcement Message UE 1 is transmitted by the sidelink anchor device 1004. Additionally, Announcement Message UE 1 indicates that the sidelink anchor device 1004 is available for positioning services. Sidelink anchor device 1006 transmits an announcement message (labeled "Announcement Message UE 2"), including a sidelink anchor device identifier indicating that Announcement Message UE 2 is transmitted by sidelink anchor device 1006. Additionally, Announcement Message UE 2 includes an indication that sidelink anchor device 1006 is available for positioning services. Sidelink anchor device 1008 transmits an announcement message (labeled "Announcement Message" UE 3), which includes a sidelink anchor device identifier indicating that Announcement Message UE 3 is transmitted by sidelink anchor device 1008. Additionally, Announcement Message UE 3 indicates that sidelink anchor device 1008 is available for positioning services. In positioning environments including further sidelink anchor devices, the further sidelink anchor devices would likewise transmit similar announcement messages.

In accordance with certain aspects of the disclosure, the announcement messages from the sidelink anchor devices may be transmitted in a NACK only groupcast. In an aspect, a NACK only group cast may be used when the announcement messages from the sidelink anchor devices are to be received by multiple target UEs in the positioning environment. The announcement messages are not directed to any specific target UE, but can be received and decoded by all target UEs in the positioning environment. The target UEs can share the same physical sidelink feedback channel (PSFCH) resource for NACK feedback. As such, the positioning environment is scalable with respect to the number of sidelink anchor devices and target UEs.

At process 1016, the target UE 1010 receives the announcement messages from the sidelink anchor devices 1004, 1006, and 1008, and measures the signal strength of each announcement message. In an aspect, the target UE 1010 may measure a demodulation reference signal (DMRS) associated with each of the announcement messages. In another aspect, the target UE 1010 associates the signal strength measurement of each announcement message with the sidelink anchor device identifier corresponding the sidelink anchor device that transmitted the announcement message. In accordance with certain aspects of the disclosure, the target UE determines a reference signal received power (S-RSRP) measurement of each announcement message and associates the S-RSRP measurement with the corresponding sidelink anchor device. In the example shown in FIG. 10, the target UE 1010 associates the S-RSRP measurement of Announcement Message UE 1 with the sidelink anchor device identifier of sidelink anchor device 1004. Also, the target UE 1010 associates the S-RSRP measurement of Announcement Message UE 2 with the sidelink anchor device identifier of sidelink anchor device 1006. Still further, the target UE 1010 associates the S-RSRP measurement of Announcement Message UE 3 with the sidelink anchor device identifier of sidelink anchor device 1008. In positioning environments employing more sidelink anchor devices than shown in FIG. 10, the target UE 1010 would perform such measurements and associations for each announcement message received from the additional sidelink anchor devices. Based on the teachings of the present disclosure, it will be recognized that the call flow 1000 may be extended to positioning environments having one or more additional target UEs beyond the single target UE 1010 shown in FIG. 10.

Once the target UE 1010 has measured the signal strengths of the announcement messages, the target UE 1010 determines which of the sidelink anchor devices 1004, 1006, and 1008 are designated as preferred sidelink anchor devices for positioning services. To this end, the target UE 1010 selects one or more preferred sidelink anchor devices from the available sidelink anchor devices 1004, 1006, and 1008 as preferred sidelink anchor devices. In an aspect, fewer than all of the available sidelink anchor devices are designated as preferred sidelink anchor devices. In another aspect, all of the available sidelink anchor devices are designated as preferred sidelink anchor devices.

In accordance with certain aspects of the disclosure, the preferred sidelink anchor devices are determined by the target UE 1010 based on the signal strength measurements of the announcement messages at operation 1020. As an example, only sidelink anchor devices associated with S-RSRP measurements exceeding a threshold S-RSRP measurement value are selected as preferred sidelink anchor devices. In an aspect, the target UE 1010 may choose sidelink anchor devices with higher S-RSRP measurements as preferred sidelink anchor devices since the higher S-RSRP measurements tend to indicate a shorter distance between the target UE and the sidelink anchor device. Such shorter distances have a higher probability that the path between the target UE and the sidelink anchor device is a line-of-sight (LOS) path. Sidelink anchor devices with lower S-RSRP measurements tend to indicate a larger distance between the target UE and the sidelink anchor device. Such larger distances have a higher probability that the path between the target UE and the sidelink anchor device is a non-line-of-sight (NLOS) path. Measurements taken by the target UE of signals (e.g., positioning reference signals) transmitted by sidelink anchor devices in a LOS path are more likely to result in accurate target UE positioning determinations than measurements taken by the target UE of signals transmitted from sidelink anchor devices having an NLOS path.

Once the target UE has determined which sidelink anchor devices are preferred sidelink anchor devices, the target UE 1010 provides a preferred anchor report directly to network 1002. The preferred anchor report may include the sidelink anchor device identifiers of the preferred sidelink anchor devices. In accordance with certain aspects of the disclosure, each sidelink anchor device identifier may be reported with the signal strength measurement (e.g., S-RSRP measurement) respectively associated with the sidelink anchor device identifier. Network 1002 may use the signal strength measurements of the preferred anchor report to obtain an initial fix on the position of the target UE 1010. To save reporting payload, the S-RSRP measurements can be reported as differential values with respect to an absolute value, where the absolute value corresponds to an S-RSRP measurement associated with a reference sidelink anchor device. For example, three S-RSRP measurements may be reported as R1, ΔR2, ΔR3, where the "Δ"s are reported as values corresponding to a difference between the signal strength measurement and the absolute value R1 corresponding to the S-RSRP measurement of the reference sidelink anchor device.

As shown in FIG. 10, the target UE 1010 provides the preferred anchor report directly to the network 1002 as opposed reporting the measurements directly to the sidelink anchor devices 1004, 1006, and 1008. Reporting the preferred sidelink anchor devices to the network 1002 obviates the need for the individual sidelink anchor devices to participate in certain operations in the sidelink resource discovery process. For example, in the call flow 1000, the sidelink anchor devices need not continuously monitor for transmissions from a target UE 1010 or any other potential target UEs thereby reducing the power consumption of the sidelink anchor devices during the sidelink resource discovery process.

Figure 11:
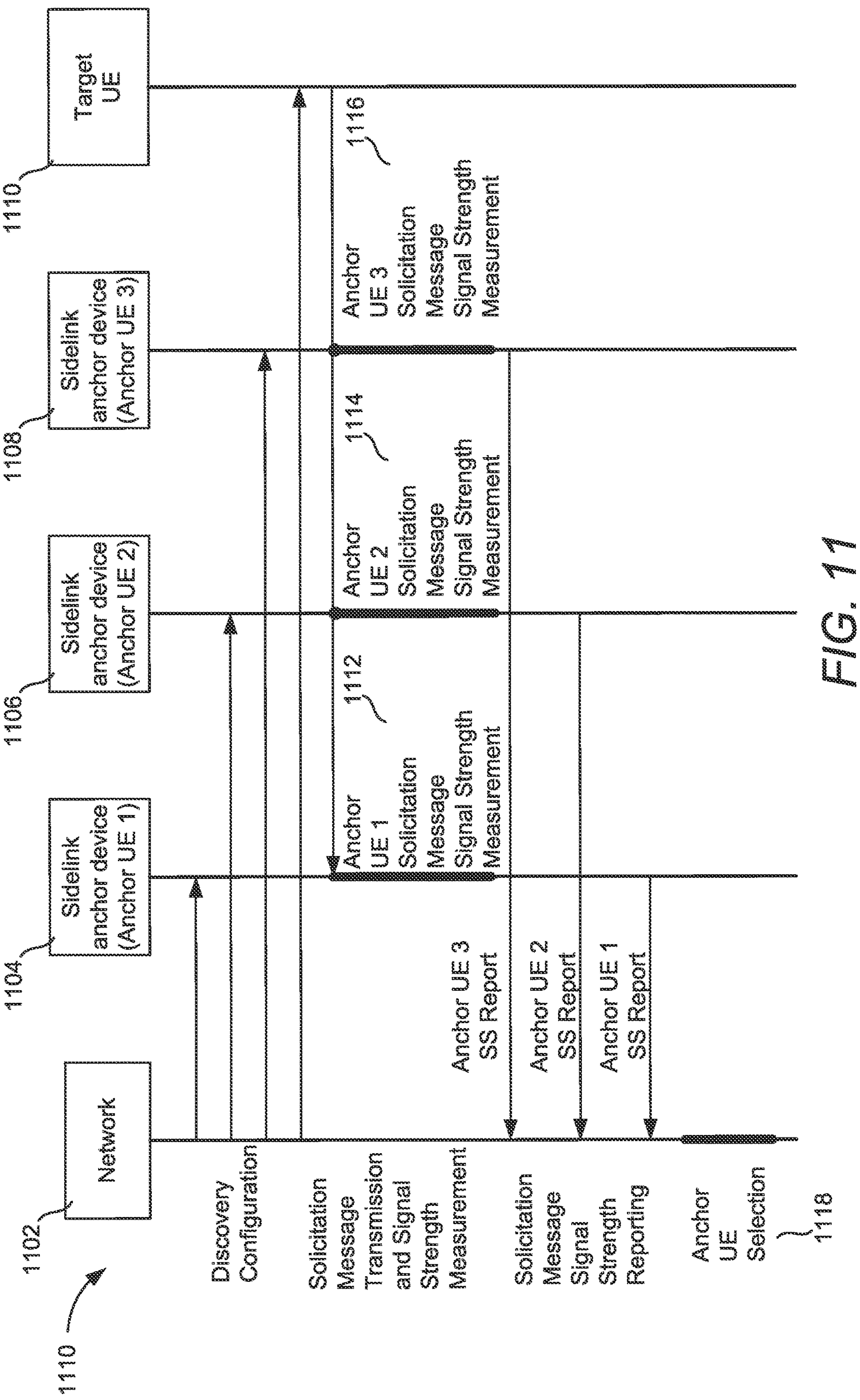
FIG. 11 illustrates an example call flow that may be employed in sidelink device discovery operations in accordance with certain aspects of the disclosure.

FIG. 11 illustrates another example call flow 1100 that may be employed in sidelink device discovery operations in accordance with certain aspects of the disclosure. In this example, the call flow 1100 involves a network 1102, a target UE 1110 (labeled "Target UE"), and three sidelink anchor devices 1104, 1106, and 1108 (respectively labeled "Anchor UE 1," "Anchor UE 2," and "Anchor UE 3"). It will be recognized, based on the teachings herein, that the call flow 1100 shown in FIG. 11 may be extended to positioning environments including a larger number of anchor UEs and target UEs than shown in FIG. 11. The positioning environment in which call flow 1100 is shown constitutes a non-limiting example.

During a discovery configuration stage, the network 1102 configures and/or indicates target UE 1110, and any other target UEs in the positioning environment, with transmission resources in a sidelink discovery resource pool to broadcast respective solicitation messages in a manner similar to Discovery Model B. Additionally, or in the alternative, network 1102 may configure and/or indicate sidelink anchor devices 1104, 1106, and 1108 with reception discovery resources that are used to monitor transmission of solicitation messages within the positioning environment.

Once the discovery configuration stage is at least substantially complete, target UEs in the positioning environment may transmit respective solicitation messages. Each target UE may transmit its solicitation message in a periodic broadcast. In one aspect, the periodic broadcasts may follow a schedule indicated by the network 1102 during the discovery configuration stage. Additionally, or in the alternative, each target UE may transmit its solicitation message in an on-demand manner in response to a request received from the network 1102. In contrast to the operation of the sidelink anchor devices in the sidelink device discovery process shown in FIG. 10, the sidelink anchor devices in the sidelink discovery process shown in FIG. 11 may need to continuously monitor the positioning environment for solicitation messages from potential target UEs.

Although the positioning environment may include multiple target UEs, only target UE 1110 is discussed herein for simplicity. As shown, the target UE 1110 transmits a solicitation message that is received by each of the sidelink anchor devices 1104, 1106, and 1108. The solicitation message includes a UE identifier that identifies target UE 1110 as the target UE sending the solicitation message. Further, the solicitation message includes an indication that the solicitation message is transmitted as a positioning service request. In positioning environments having multiple target UEs, the solicitation message sent by each target UE may be transmitted in a NACK only groupcast so that any sidelink anchor device within the positioning environment may decode and measure the solicitation message.

In response to receipt and proper decoding of the solicitation message, each sidelink anchor device 1104, 1106, and 1108 measures the received signal strength of the solicitation message. To this end, sidelink anchor device 1104 measures the signal strength of the solicitation message at operation 1112. Sidelink anchor device 1106 measures the strength of the solicitation message at operation 1114. Sidelink anchor device 1108 measures the strength of the solicitation message at operation 1116.

As shown, each sidelink anchor device 1104, 1106, and 1108 reports its signal strength measurement of the solicitation message directly to network 1102 in respective signal strength reports. In an aspect, the signal strength report from each sidelink anchor device may include the UE identifier of the target UE 1110 that transmitted the solicitation message, and the signal strength of the solicitation message as measured by the sidelink anchor device. In accordance with certain aspects, the signal strength measurement provided by each sidelink anchor device may be an S-RSRP measurement of the solicitation message as received by the sidelink anchor device. In an aspect, each sidelink anchor device may measure the DMRS associated with the solicitation message to determine the measured signal strength. In the example shown in FIG. 11, sidelink anchor device 1108 transmits its measurement of the signal strength of the solicitation message in the transmission labeled Anchor UE 3 SS Report. Sidelink anchor device 1106 transmits its measurement of the signal strength of the solicitation message in the transmission labeled Anchor UE 2 SS Report. Sidelink anchor device 1104 transmits its measurement of the signal strength of the solicitation message in the transmission labeled Anchor UE 1 SS Report.

In accordance with certain aspects, at operation 1118, the network 1102 may select which of the sidelink anchor devices that the network 1102 will use to determine the position of the target UE 1110 during subsequent positioning operations. In an aspect, the sidelink anchor devices that the network 1102 selects for positioning are determined based on the signal strength measurements of the solicitation message measured by each sidelink anchor device. As an example, only sidelink anchor devices associated with an S-RSRP measurement of the solicitation message exceeding a threshold S-RSRP measurement value are selected as sidelink anchor devices that are used to determine the position of the target UE 1110. In an aspect, the network 1102 may choose sidelink anchor devices having higher S-RSRP measurements of the solicitation message as preferred sidelink anchor devices since the higher S-RSRP measurements of the solicitation message tend to indicate a shorter distance between the target UE 1110 and the sidelink anchor device. Such shorter distances have a higher probability that the path between the target UE 1110 and the sidelink anchor device is a line-of-sight (LOS) path. Sidelink anchor devices with lower S-RSRP measurements of the solicitation message indicate that there is a larger distance between the target UE 1110 and the sidelink anchor device. Such larger distances have a higher probability that the path between the target UE 1110 and the sidelink anchor device is a non-line-of-sight (NLOS) path. Measurements of signals (e.g., positioning reference signals (PRS)) taken by the sidelink anchor devices having a LOS path with the target UE 1110 are likely to result in more accurate target UE positioning determinations than measurements taken by the sidelink anchor devices having an NLOS path with the target UE 1110. In an aspect, the network 1102 may use the signal strength measurements of the solicitation message reported by the sidelink anchor devices to obtain an initial fix on the position of the target UE 1110.

Figure 12:
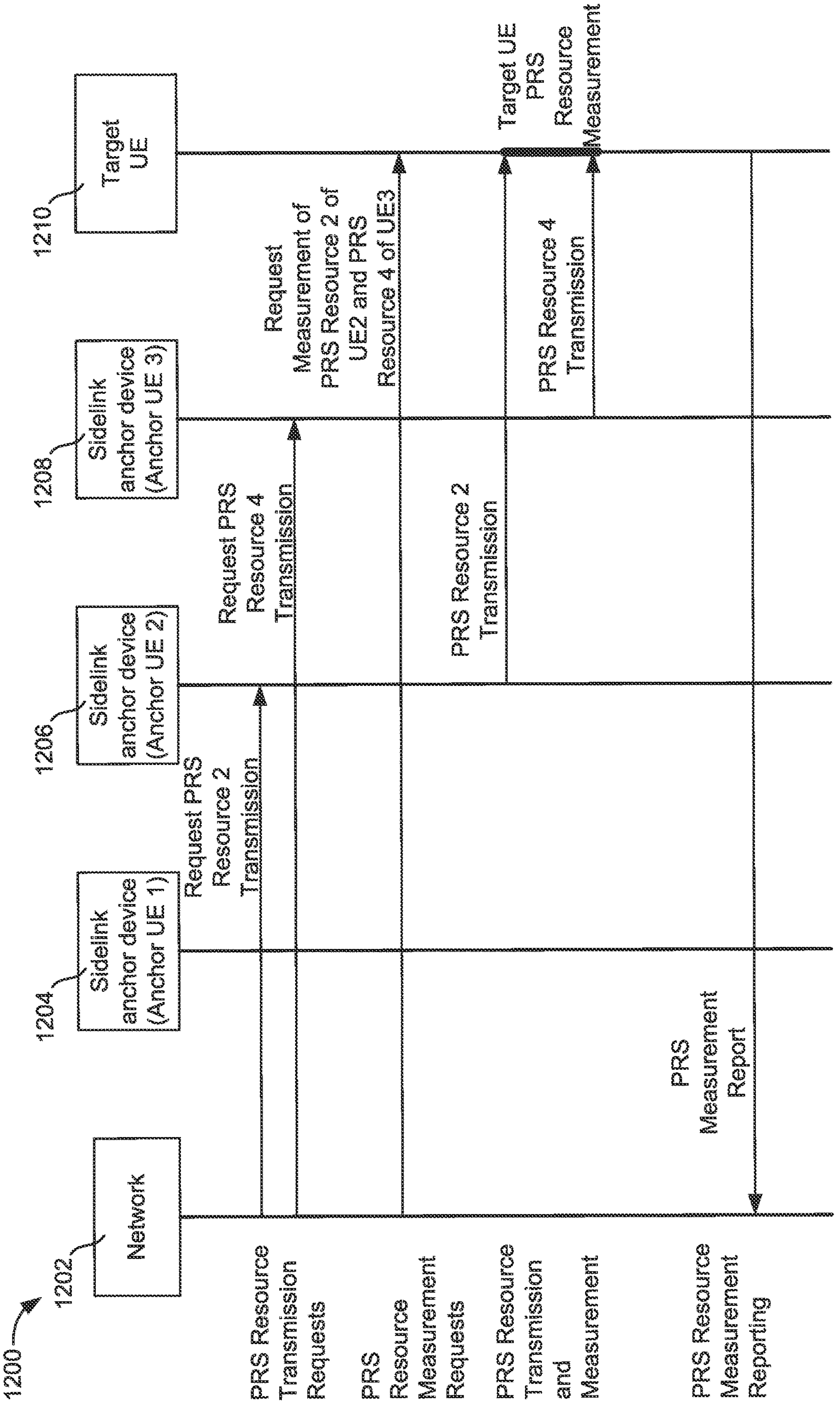
FIG. 12 illustrates an example call flow for positioning operations that may be executed in accordance with certain aspects of the disclosure.

FIG. 12 illustrates an example call flow 1200 for positioning operations that may be executed in accordance with certain aspects of the disclosure. In this example, network 1202 controls the operation of sidelink anchor devices 1204, 1206, 1208, and target UE 1210 during the positioning operations. For purposes of the following discussion, it is assumed that sidelink anchor devices 1206 and 1208 are being used as the preferred anchor devices by the target UE 1210. Accordingly, only sidelink anchor devices 1204 and 1206 are involved in the positioning operations described in connection with FIG. 12. However, the network 1202 may merely use the preferred anchor report as positioning assistance data and elect to use additional sidelink anchor devices or fewer sidelink anchor devices than the reported preferred sidelink anchor devices.

As shown in FIG. 12, the network 1202 transmits a PRS transmission request to each of the preferred sidelink anchor devices 1206 and 1208. The PRS transmission request to each of the preferred sidelink anchor devices requests transmission of one or more PRS by each preferred sidelink anchor devices. In this example, the network 1202 transmits a PRS transmission request to sidelink anchor device 1206 requesting the transmission of PRS on PRS Resource 2 by the sidelink anchor device 1206, and a PRS resource transmission request to sidelink anchor device 1208 requesting the transmission of PRS on PRS Resource 4 by the sidelink anchor device 1208. In systems employing a larger number of preferred sidelink anchor devices, similar PRS requests are sent to each of the additional preferred sidelink anchor devices.

The network 1202 sends a PRS measurement request to the target UE 1210 to measure the PRS that have been requested for transmission from sidelink anchor devices 1206 and 1208. In this example, the network 1202 sends a PRS measurement request to the target UE 1210 to measure one or more PRS are transmitted in PRS Resource 2 of sidelink anchor device 1206 and one or more PRS are transmitted in PRS Resource 4 of sidelink anchor device 1208. In response to the PRS resource transmission requests from the network 1202, sidelink anchor device 1206 transmits its PRS in PRS Resource 2, and sidelink anchor device 1208 transmits its PRS in PRS Resource 4. Target UE 1210 responds to the PRS measurement request from network 1202 by measuring the PRS transmitted on PRS Resource 2 of sidelink anchor device 1206 and the PRS transmitted on PRS Resource 4 of sidelink anchor device 1208. The measurements taken by the target UE 1210 are reported in a PRS measurement report that is communicated directly to the network 1202, which uses the PRS measurement report to determine the location of the target UE 1210.

The network 1202 may use various positioning methods to determine the location of the target UE 1210 using the PRS measurement report. In accordance with certain aspects, the network 1202 uses the data received in the PRS measurement report to determine the location of the target UE 1210 using time difference of arrival (TDOA) positioning, as described above with reference to FIG. 7. Since the target UE 1010 does not transmit a PRS in the call flow 1200 of FIG. 12, the network 1202 may take additional steps to compensate for synchronization errors between the sidelink anchor devices. In one example, the network 1202 may send a PRS transmission request to a first sidelink anchor device 1206 of the a sidelink anchor devices within the positioning environment, where the PRS transmission request is a request for the first sidelink anchor device 1206 to transmit one or more PRS. The network 1202 may send a PRS measurement request to a second sidelink anchor device 1208 of the sidelink anchor devices within the positioning environment, where the PRS measurement request is a request for the second sidelink anchor device 1208 to measure the transmitted PRS of the first sidelink anchor device. The second sidelink anchor device 1208 reports the measurements of the PRS to the network 1202, which can use the PRS measurements to compensate for synchronization errors that exist between the first sidelink anchor device and the second sidelink anchor device.

In accordance with certain aspects of the disclosure, the network 1202 may use multi-cell round trip time (multi-RTT) positioning, as described with reference to FIGS. 5 and 6, to determine the location of the target UE 1210. In such instances, the network 1202 may also send a PRS transmission request to the target UE 1210 that requests transmission of one or more PRS. Additionally, the network 1202 may send a PRS measurement request to each sidelink anchor device that requests the sidelink anchor device to measure the transmitted PRS of the target UE 1210. The sidelink anchor devices report the Rx-Tx time difference measurements to the network 1202, which uses the Rx-Tx time difference measurements reported by the sidelink anchor devices as well as the Rx-Tx time difference measurements reported by the target UE to determine the location of the target UE 1210 using a multi-RTT positioning method.

Figure 13:
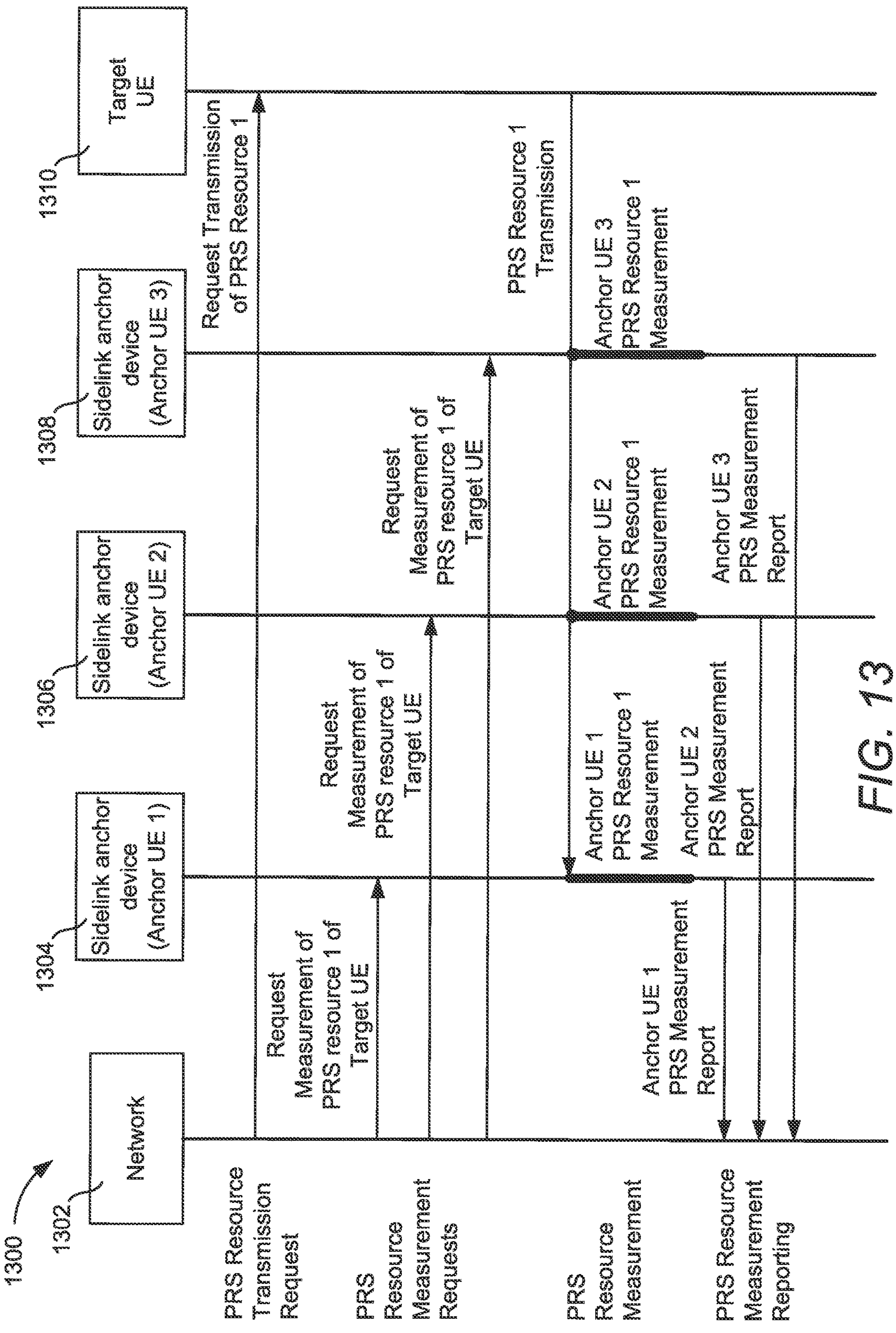
FIG. 13 illustrates an example of a call flow for positioning operations that may be executed in accordance with certain aspects of the disclosure.

FIG. 13 illustrates an example of a call flow 1300 for positioning operations that may be executed in accordance with certain aspects of the disclosure. In this example, the network 1302 controls the operation of sidelink anchor devices 1304, 1306, 1308, and target UE 1210 during the positioning operations. For purposes of the following discussion, it is assumed that all sidelink anchor devices 1304, 1306, and 1308 have been selected by the network 1302 to determine the position of the target UE 1310.

As shown in FIG. 13, the network 1302 transmits a PRS transmission request to the target UE 1310. The PRS transmission request to the target UE 1310 requests transmission of one or more PRS by the target UE 1310. In this example, the network 1302 transmits a PRS transmission request to the target UE 1310 requesting the transmission of one or more PRS in PRS Resource 1.

The network 1302 transmits a PRS measurement request to each of the sidelink anchor devices 1304, 1306, and 1308. In FIG. 13, the PRS measurement request to each sidelink anchor device requests the sidelink anchor device to measure one or more PRS transmitted in PRS Resource 1 of the target UE 1310. The target UE 1310 transmits one or more PRS in PRS Resource 1, which is received by each of the sidelink anchor devices 1304, 1306, and 1308. Each sidelink anchor device measures the signal strength of the PRS in PRS Resource 1 and reports the PRS measurement to the network 1302 in a corresponding measurement report. The network 1302 may determine the position of the target UE 1310 using the PRS measurement reports received from the sidelink anchor devices 1304, 1306, and 1308.

Figure 14:
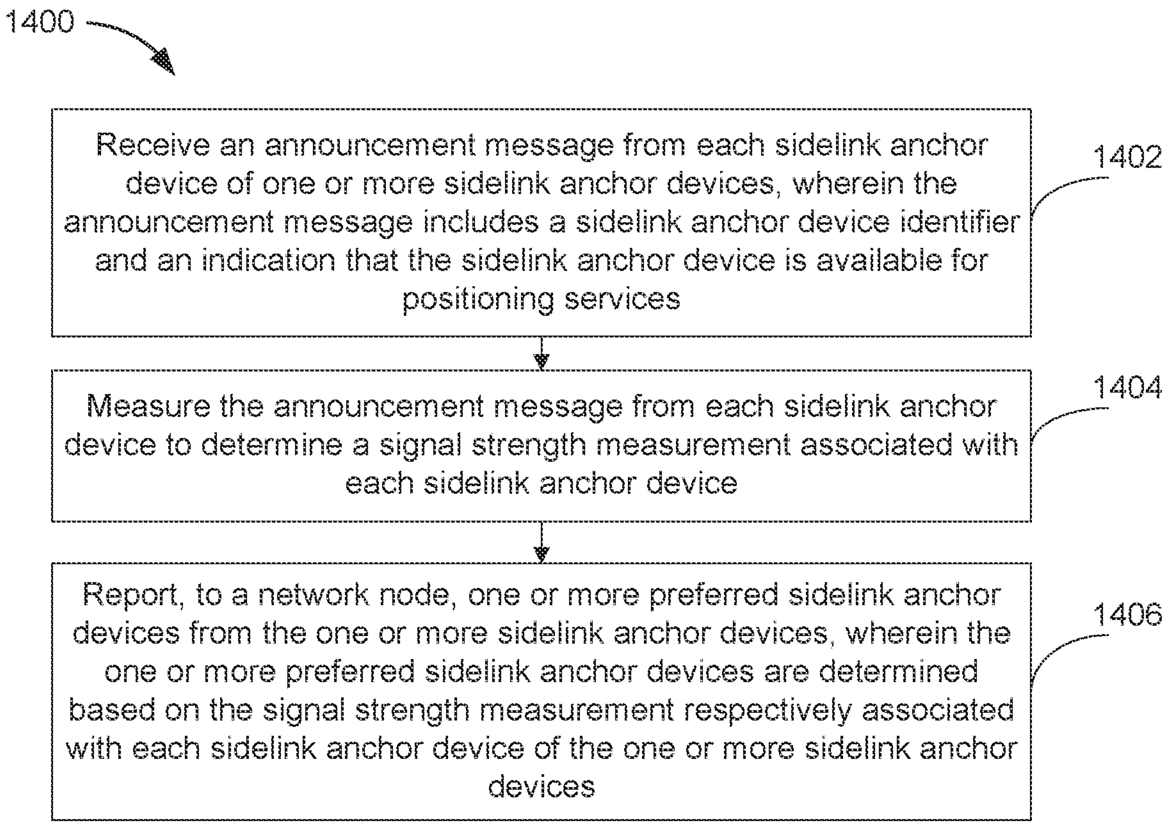
FIG. 14 illustrates an example method of wireless communication performed by a UE.

FIG. 14 illustrates an example method 1400 of wireless communication performed by a user equipment (UE). At operation 1402, the UE receives an announcement message from each sidelink anchor device of one or more sidelink anchor devices, wherein the announcement message includes a sidelink anchor device identifier and an indication that the sidelink anchor device is available for positioning services. In an aspect, operation 1402 may be performed by the one or more WWAN transceivers 310, the one or more processors 332, memory 340, and/or sidelink component 342, any or all of which may be considered means for performing this operation.

At operation 1404, the UE measures the announcement message from each sidelink anchor device to determine a signal strength measurement associated with each sidelink anchor device. In an aspect, operation 1404 may be performed by the one or more WWAN transceivers 310, the one or more processors 332, memory 340, and/or sidelink component 342, any or all of which may be considered means for performing this operation.

At operation 1406, the UE reports, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices. In an aspect, operation 1406 may be performed by the one or more WWAN transceivers 310, the one or more processors 332, memory 340, and/or sidelink component 342, any or all of which may be considered means for performing this operation.

As will be appreciated, a technical advantage of method 1400 is that the sidelink anchor devices do not need to continuously provide positioning services during sidelink resource discovery thereby making the process more energy-efficient. Additionally, the preferred sidelink anchor devices are the sidelink anchor devices that are more likely to have a LOS path with the target UE. Subsequent positioning measurements made using the preferred sidelink anchor devices may result in more accurate determinations of the position of the target UE. Another technical advantage relates to resource savings resulting from the reduction in the number of SL-PRS transmissions that take place during the discovery operations.

Figure 15:
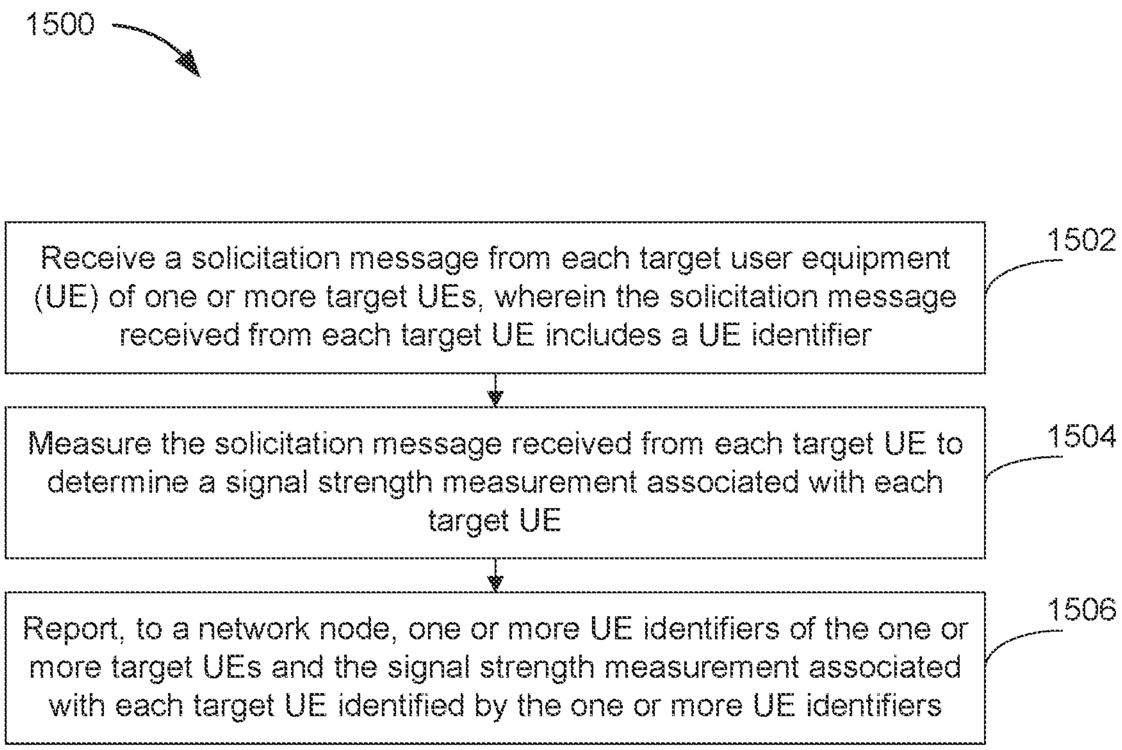
FIG. 15 illustrates an example method of wireless communication performed by a sidelink anchor device.

FIG. 15 illustrates an example method 1500 of wireless communication performed by a sidelink anchor device. At operation 1502, the sidelink anchor device receives a solicitation message from each target user equipment (UE) of one or more target UEs, wherein the solicitation message received from each target UE includes a UE identifier. In an aspect, operation 1500 may be performed by the one or more WWAN transceivers 310, the one or more processors 332, memory 340, and/or sidelink component 342, any or all of which may be considered means for performing this operation.

At operation 1504, the sidelink anchor device measures the solicitation message received from each target UE to determine a signal strength measurement associated with each target UE. In an aspect, operation 1504 may be performed by the one or more WWAN transceivers 310, the one or more processors 332, memory 340, and/or sidelink component 342, any or all of which may be considered means for performing this operation.

At operation 1506, the sidelink anchor device reports, to a network node, one or more UE identifiers of the one or more target UEs and the signal strength measurement associated with each target UE identified by the one or more UE identifiers. In an aspect, operation 1506 may be performed by the one or more WWAN transceivers 310, the one or more processors 332, memory 340, and/or sidelink component 342, any or all of which may be considered means for performing this operation.

As will be appreciated, a technical advantage of method 1500 is that the network control of the target UE and sidelink anchor devices during a discovery procedure means that the sidelink anchor devices only monitor potential solicitation messages transmitted by potential target UEs. As such, the sidelink anchor devices need not provide continuous positioning services resulting in resource savings. Another technical advantage is that the network node receives signal strength reports from the sidelink anchor devices that allow the network node to determine the sidelink anchor devices that are more likely to have a LOS path with the target UE. Subsequent positioning measurements made using sidelink anchor devices having a LOS path with the target UE are more likely to result in an accurate determination of the position of the target UE.

Figure 16:
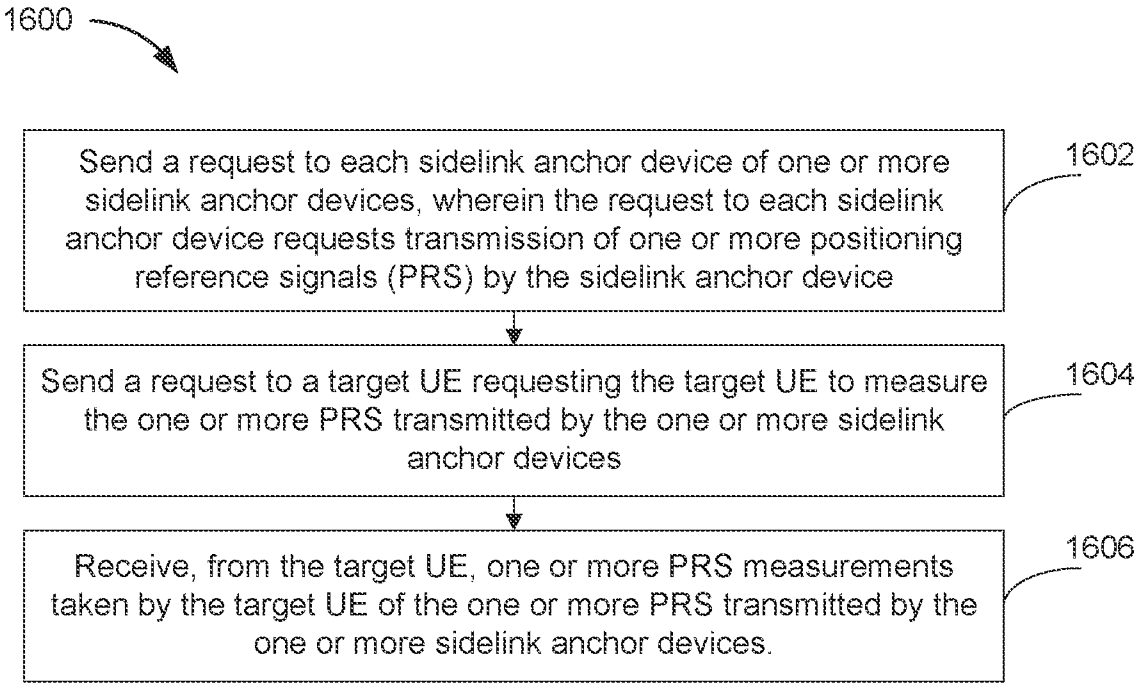
FIG. 16 illustrates an example method of wireless communication performed by a network node.

FIG. 16 illustrates an example method 1600 of wireless communication performed by a network node. At operation 1602, the network node sends a request to each sidelink anchor device of one or more sidelink anchor devices, wherein the request to each sidelink anchor device requests transmission of one or more positioning reference signals (PRS) by the sidelink anchor device. In an aspect, operation 1602 may be performed by the one or more network transceivers 398, the one or more processors 394, memory 396, and/or sidelink component 398, any or all of which may be considered means for performing this operation. In an aspect, operation 1602 may be performed by the one or more WWAN transceivers 350, the one or more network transceivers 380, the one or more processors 384, memory 386, and/or sidelink component 388, any or all of which may be considered means for performing this operation.

At operation 1604, the network node sends a request to a target UE requesting the target UE to measure the one or more PRS transmitted by the one or more sidelink anchor devices. In an aspect, operation 1604 may be performed by the one or more network transceivers 398, the one or more processors 394, memory 396, and/or sidelink component 398, any or all of which may be considered means for performing this operation. In an aspect, operation 1604 may be performed by the one or more WWAN transceivers 350, the one or more network transceivers 380, the one or more processors 384, memory 386, and/or sidelink component 388, any or all of which may be considered means for performing this operation.

At operation 1606, the network node receives, from the target UE, one or more PRS measurements taken by the target UE of the one or more PRS transmitted by the one or more sidelink anchor devices. In an aspect, operation 1606 may be performed by the one or more network transceivers 398, the one or more processors 394, memory 396, and/or sidelink component 398, any or all of which may be considered means for performing this operation. In an aspect, operation 1606 may be performed by the one or more WWAN transceivers 350, the one or more network transceivers 380, the one or more processors 384, memory 386, and/or sidelink component 388, any or all of which may be considered means for performing this operation.

As will be appreciated, a technical advantage of method 1600 is that the network control of the target UE and sidelink anchor devices during a positioning operations means that the target UE and sidelink anchor devices only transmit PRS, receive transmitted PRS, and measure the transmitted PRS for the duration determined by the network node. As such, the target UE and sidelink anchor devices need only transmit the PRS (which is general with a large bandwidth) on-demand rather than persistently. Another technical advantage is that the network node receives signal strength reports from the target UE that allow the network node to determine the sidelink anchor devices that are more likely to have a LOS path with the target UE. Subsequent positioning measurements made using sidelink anchor devices having a LOS path with the target UE are more likely to result in an accurate determination of the position of the target UE.

Figure 17:
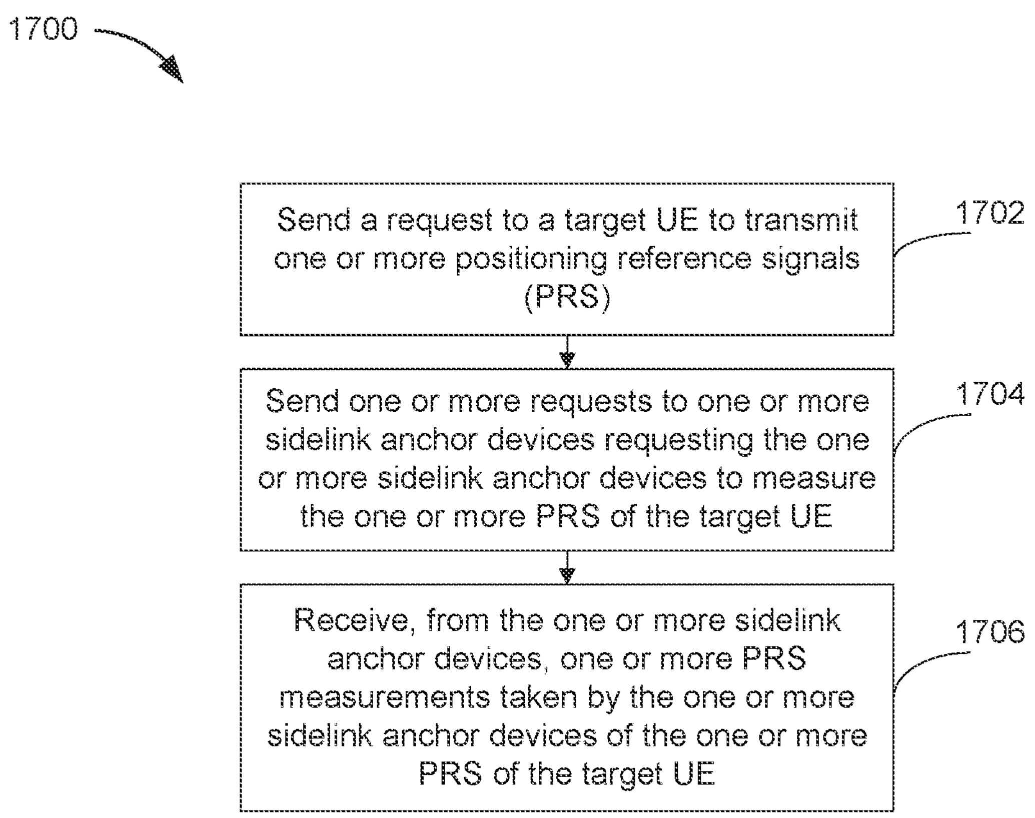
FIG. 17 illustrates an example method of wireless communication performed by a network node.

FIG. 17 illustrates an example method 1700 of wireless communication performed by a network node. At operation 1702, the network node sends a request to a target UE to transmit one or more positioning reference signals (PRS). In an aspect, operation 1702 may be performed by the one or more network transceivers 398, the one or more processors 394, memory 396, and/or sidelink component 398, any or all of which may be considered means for performing this operation. In an aspect, operation 1702 may be performed by the one or more WWAN transceivers 350, the one or more network transceivers 380, the one or more processors 384, memory 386, and/or sidelink component 388, any or all of which may be considered means for performing this operation.

At operation 1704, the network node sends one or more requests to one or more sidelink anchor devices requesting the one or more sidelink anchor devices to measure the one or more PRS of the target UE. In an aspect, operation 1704 may be performed by the one or more network transceivers 398, the one or more processors 394, memory 396, and/or sidelink component 398, any or all of which may be considered means for performing this operation. In an aspect, operation 1704 may be performed by the one or more WWAN transceivers 350, the one or more network transceivers 380, the one or more processors 384, memory 386, and/or sidelink component 388, any or all of which may be considered means for performing this operation At operation 1706, the network node receives, from the one or more sidelink anchor devices, one or more PRS measurements taken by the one or more sidelink anchor devices of the one or more PRS of the target UE. In an aspect, operation 1706 may be performed by the one or more network transceivers 398, the one or more processors 394, memory 396, and/or sidelink component 398, any or all of which may be considered means for performing this operation. In an aspect, operation 1706 may be performed by the one or more WWAN transceivers 350, the one or more network transceivers 380, the one or more processors 384, memory 386, and/or sidelink component 388, any or all of which may be considered means for performing this operation As will be appreciated, a technical advantage of method 1700 is that the network control of the target UE and sidelink anchor devices during a positioning operations means that the target UE and sidelink anchor devices only transmit PRS, receive PRS, and measure the transmitted PRS for the duration determined by the network node. As such, the target UE and sidelink anchor devices need only transmit the PRS (which is general with a large bandwidth) on-demand rather than persistently. Another technical advantage is that the network node receives signal strength reports from the target UE that allow the network node to determine the sidelink anchor devices that are more likely to have a LOS path with the target UE. Subsequent positioning measurements made using sidelink anchor devices having a LOS path with the target UE are more likely to result in an accurate determination of the position of the target UE.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving an announcement message from each sidelink anchor device of one or more sidelink anchor devices, wherein the announcement message includes a sidelink anchor device identifier and an indication that the sidelink anchor device is available for positioning services; measuring the announcement message from each sidelink anchor device to determine a signal strength measurement associated with each sidelink anchor device; and reporting, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

Clause 2. The method of clause 1, wherein measuring the announcement message from each sidelink anchor device to determine the signal strength measurement comprises: measuring a demodulation reference signal (DMRS) associated with the announcement message from each sidelink anchor device of the one or more sidelink anchor devices.

Clause 3. The method of any of clauses 1 to 2, wherein: the signal strength measurement includes a sidelink reference signal received power (S-RSRP) measurement.

Clause 4. The method of clause 3, wherein: only sidelink anchor devices having an S-RSRP measurement exceeding a threshold are reported as the one or more preferred sidelink anchor devices.

Clause 5. The method of any of clauses 3 to 4, wherein reporting, to the network node, the sidelink anchor device identifiers of the one or more preferred sidelink anchor devices further comprises: reporting, to the network node, the S-RSRP measurement associated with each preferred sidelink anchor device of the one or more preferred sidelink anchor devices.

Clause 6. The method of clause 5, wherein: the S-RSRP measurement is reported to the network node as a differential value with respect to an absolute value, wherein the absolute value corresponds to an S-RSRP measurement associated with a reference sidelink anchor device.

Clause 7. The method of any of clauses 1 to 6, further comprising: receiving, from the network node, a request to measure one or more positioning reference signals (PRS) transmitted by the one or more preferred sidelink anchor devices; and reporting measurements of the one or more PRS transmitted by the one or more preferred sidelink anchor devices to the network node.

Clause 8. The method of any of clauses 1 to 7, further comprising: receiving, from the network node, a request for the UE to transmit one or more positioning reference signals (PRS); and transmitting, by the UE, the one or more PRS.

Clause 9. The method of any of clauses 1 to 8, wherein: announcement messages received from the one or more sidelink anchor devices are received in a NACK only groupcast.

Clause 10. The method of clause 9, wherein: the NACK only groupcast is enabled for distance-based or RSRP-based, hybrid automatic repeat request (HARQ) feedback.

Clause 11. A method of wireless communication performed by a sidelink anchor device, comprising: receiving a solicitation message from each target user equipment (UE) of one or more target UEs, wherein the solicitation message received from each target UE includes a UE identifier; measuring the solicitation message received from each target UE to determine a signal strength measurement associated with each target UE; and reporting, to a network node, one or more UE identifiers of the one or more target UEs and the signal strength measurement associated with each target UE identified by the one or more UE identifiers.

Clause 12. The method of clause 11, wherein: the solicitation message received from each target UE of the one or more target UEs is received in a NACK only groupcast.

Clause 13. The method of clause 12, wherein: the NACK only groupcast is enabled for distance-based or RSRP-based, hybrid automatic repeat request (HARQ) feedback.

Clause 14. A method of wireless communication performed by a network node, comprising: sending a request to each sidelink anchor device of one or more sidelink anchor devices, wherein the request to each sidelink anchor device requests transmission of one or more positioning reference signals (PRS) by the sidelink anchor device; sending a request to a target UE requesting the target UE to measure the one or more PRS transmitted by the one or more sidelink anchor devices; and receiving, from the target UE, one or more PRS measurements taken by the target UE of the one or more PRS transmitted by the one or more sidelink anchor devices.

Clause 15. The method of clause 14, further comprising: configuring each of the sidelink anchor devices of the one or more sidelink anchor devices with transmission resources in a sidelink discovery resource pool to transmit an announcement message.

Clause 16. The method of any of clauses 14 to 15, further comprising: determining a location of the target UE based on the one or more PRS measurements received from the target UE using time difference of arrival (TDOA) positioning.

Clause 17. The method of clause 16, further comprising: sending a first request to a first sidelink anchor device of the one or more sidelink anchor devices, wherein the first request is a request for the first sidelink anchor device to transmit one or more PRS; sending a second request to a second sidelink anchor device of the one or more sidelink anchor devices, wherein the second request is a request for the second sidelink anchor device to measure the one or more PRS of the first sidelink anchor device; receiving, from the second sidelink anchor device, one or more PRS measurements taken by the second sidelink anchor device of the one or more PRS of the first sidelink anchor device; and compensating for synchronization errors between the first sidelink anchor device and the second sidelink anchor device using the one or more PRS measurements received from the second sidelink anchor device when determining the location of the target UE using the time difference of arrival positioning.

Clause 18. The method of any of clauses 14 to 17, further comprising: sending, to the target UE, a request to transmit one or more PRS; sending a request to each sidelink anchor device of one or more sidelink anchor devices, wherein the request to each sidelink anchor device requests the sidelink anchor device to measure the one or more PRS of the target UE; and receiving, from the one or more sidelink anchor devices, one or more PRS measurements taken by the one or more sidelink anchor devices of the one or more PRS of the target UE.

Clause 19. The method of clause 18, further comprising: determining a location of the target UE based on the one or more PRS measurements received from the one or more sidelink anchor devices using multi-cell round trip time positioning.

Clause 20. The method of any of clauses 14 to 19, further comprising: receiving, from the target UE, a signal strength measurement for each sidelink anchor device of the one or more sidelink anchor devices, wherein the signal strength measurement corresponds to a measurement of an announcement message received by the target UE from the sidelink anchor device.

Clause 21. The method of clause 20, wherein the signal strength measurement comprises: a sidelink reference signal received power (S-RSRP) measurement.

Clause 22. The method of clause 21, wherein: a request to the one or more sidelink anchor devices to transmit the one or more PRS are only sent by the network node to sidelink anchor devices having an S-RSRP measurement of the announcement message, as measured by the target UE, exceeding a threshold.

Clause 23. The method of any of clauses 21 to 22, further comprising: estimating a position of the target UE based on the S-RSRP measurement for each sidelink anchor device of the one or more sidelink anchor devices.

Clause 24. A method of wireless communication performed by a network node, comprising: sending a request to a target UE to transmit one or more positioning reference signals (PRS); sending one or more requests to one or more sidelink anchor devices requesting the one or more sidelink anchor devices to measure the one or more PRS of the target UE; and receiving, from the one or more sidelink anchor devices, one or more PRS measurements taken by the one or more sidelink anchor devices of the one or more PRS of the target UE.

Clause 25. The method of clause 24, further comprising: configuring the target UE with transmission resources in a sidelink discovery resource pool to broadcast a solicitation message.

Clause 26. The method of any of clauses 24 to 25, further comprising: sending a request to the target UE to transmit a solicitation message.

Clause 27. The method of any of clauses 24 to 26, further comprising: receiving, from each sidelink anchor device of the one or more sidelink anchor devices, a signal strength measurement of a solicitation message associated with the target UE.

Clause 28. The method of clause 27, wherein the signal strength measurement received from each sidelink anchor device of the one or more sidelink anchor devices includes a sidelink reference signal received power (S-RSRP) measurement of the solicitation message associated with the target UE.

Clause 29. The method of clause 28, further comprising: estimating a position of the target UE based on the S-RSRP measurement of the solicitation message received by each sidelink anchor device of the one or more sidelink anchor devices.

Clause 30. The method of any of clauses 28 to 29, wherein: the one or more requests to the one or more sidelink anchor devices to measure the one or more PRS of the target UE are only sent by the network node to sidelink anchor devices having an S-RSRP measurement of the solicitation message associated with the target UE exceeding a threshold.

Clause 31. A user equipment (UE), comprising: a memory; at least one transceiver, and at least one processor communicatively coupled to the memory and the at least one transceiver, the at least one processor configured to: receive, via the at least one transceiver, an announcement message from each sidelink anchor device of one or more sidelink anchor devices, wherein the announcement message includes a sidelink anchor device identifier and an indication that the sidelink anchor device is available for positioning services; measure the announcement message from each sidelink anchor device to determine a signal strength measurement associated with each sidelink anchor device; and report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

Clause 32. The UE of clause 31, wherein, to measure the announcement message from each sidelink anchor device to determine the signal strength measurement, the at least one processor is configured to: measure a demodulation reference signal (DMRS) associated with the announcement message from each sidelink anchor device of the one or more sidelink anchor devices.

Clause 33. The UE of any of clauses 31 to 32, wherein: the signal strength measurement includes a sidelink reference signal received power (S-RSRP) measurement.

Clause 34. The UE of clause 33, wherein: only sidelink anchor devices having an S-RSRP measurement exceeding a threshold are reported as the one or more preferred sidelink anchor devices.

Clause 35. The UE of any of clauses 33 to 34, wherein, to report, to the network node, the sidelink anchor device identifiers of the one or more preferred sidelink anchor devices, the at least one processor is configured to: report, to the network node, the S-RSRP measurement associated with each preferred sidelink anchor device of the one or more preferred sidelink anchor devices.

Clause 36. The UE of clause 35, wherein: the S-RSRP measurement is reported to the network node as a differential value with respect to an absolute value, wherein the absolute value corresponds to an S-RSRP measurement associated with a reference sidelink anchor device.

Clause 37. The UE of any of clauses 31 to 36, wherein the at least one processor is further configured to: receive, via the at least one transceiver, from the network node, a request to measure one or more positioning reference signals (PRS) transmitted by the one or more preferred sidelink anchor devices; and report measurements of the one or more PRS transmitted by the one or more preferred sidelink anchor devices to the network node.

Clause 38. The UE of any of clauses 31 to 37, wherein the at least one processor is further configured to: receive, via the at least one transceiver, from the network node, a request for the UE to transmit one or more positioning reference signals (PRS); and transmit, via the at least one transceiver, the one or more PRS.

Clause 39. The UE of any of clauses 31 to 38, wherein: announcement messages received from the one or more sidelink anchor devices are received in a NACK only groupcast.

Clause 40. The UE of clause 39, wherein: the NACK only groupcast is enabled for distance-based or RSRP-based, hybrid automatic repeat request (HARQ) feedback.

Clause 41. A sidelink anchor device, comprising: a memory; at least one transceiver; and at least one processor communicatively coupled to the memory and the at least one transceiver, the at least one processor configured to: receive, via the at least one transceiver, a solicitation message from each target user equipment (UE) of one or more target UEs, wherein the solicitation message received from each target UE includes a UE identifier; measure the solicitation message received from each target UE to determine a signal strength measurement associated with each target UE; and report, to a network node, one or more UE identifiers of the one or more target UEs and the signal strength measurement associated with each target UE identified by the one or more UE identifiers.

Clause 42. The sidelink anchor device of clause 41, wherein: the solicitation message received from each target UE of the one or more target UEs is received in a NACK only groupcast.

Clause 43. The sidelink anchor device of clause 42, wherein: the NACK only groupcast is enabled for distance-based or RSRP-based, hybrid automatic repeat request (HARQ) feedback.

Clause 44. A network node, comprising: a memory; at least one transceiver; and at least one processor communicatively coupled to the memory and the at least one transceiver, the at least one processor configured to: send, via the at least one transceiver, a request to each sidelink anchor device of one or more sidelink anchor devices, wherein the request to each sidelink anchor device requests transmission of one or more positioning reference signals (PRS) by the sidelink anchor device; send, via the at least one transceiver, a request to a target UE requesting the target UE to measure the one or more PRS transmitted by the one or more sidelink anchor devices; and receive, via the at least one transceiver, from the target UE, one or more PRS measurements taken by the target UE of the one or more PRS transmitted by the one or more sidelink anchor devices.

Clause 45. The network node of clause 44, wherein the at least one processor is further configured to: configure each of the sidelink anchor devices of the one or more sidelink anchor devices with transmission resources in a sidelink discovery resource pool to transmit an announcement message.

Clause 46. The network node of any of clauses 44 to 45, wherein the at least one processor is further configured to: determine a location of the target UE based on the one or more PRS measurements received from the target UE using time difference of arrival (TDOA) positioning.

Clause 47. The network node of clause 46, wherein the at least one processor is further configured to: send, via the at least one transceiver, a first request to a first sidelink anchor device of the one or more sidelink anchor devices, wherein the first request is a request for the first sidelink anchor device to transmit one or more PRS; send, via the at least one transceiver, a second request to a second sidelink anchor device of the one or more sidelink anchor devices, wherein the second request is a request for the second sidelink anchor device to measure the one or more PRS of the first sidelink anchor device; receive, via the at least one transceiver, from the second sidelink anchor device, one or more PRS measurements taken by the second sidelink anchor device of the one or more PRS of the first sidelink anchor device; and compensate for synchronization errors between the first sidelink anchor device and the second sidelink anchor device using the one or more PRS measurements received from the second sidelink anchor device when determining the location of the target UE using the time difference of arrival positioning.

Clause 48. The network node of any of clauses 44 to 47, wherein the at least one processor is further configured to: send, via the at least one transceiver, to the target UE, a request to transmit one or more PRS; send, via the at least one transceiver, a request to each sidelink anchor device of one or more sidelink anchor devices, wherein the request to each sidelink anchor device requests the sidelink anchor device to measure the one or more PRS of the target UE; and receive, via the at least one transceiver, from the one or more sidelink anchor devices, one or more PRS measurements taken by the one or more sidelink anchor devices of the one or more PRS of the target UE.

Clause 49. The network node of clause 48, wherein the at least one processor is further configured to: determine a location of the target UE based on the one or more PRS measurements received from the one or more sidelink anchor devices using multi-cell round trip time positioning.

Clause 50. The network node of any of clauses 44 to 49, wherein the at least one processor is further configured to: receive, via the at least one transceiver, from the target UE, a signal strength measurement for each sidelink anchor device of the one or more sidelink anchor devices, wherein the signal strength measurement corresponds to a measurement of an announcement message received by the target UE from the sidelink anchor device.

Clause 51. The network node of clause 50, wherein the signal strength measurement comprises: a sidelink reference signal received power (S-RSRP) measurement.

Clause 52. The network node of clause 51, wherein: a request to the one or more sidelink anchor devices to transmit the one or more PRS are only sent by the network node to sidelink anchor devices having an S-RSRP measurement of the announcement message, as measured by the target UE, exceeding a threshold.

Clause 53. The network node of any of clauses 51 to 52, wherein the at least one processor is further configured to: estimate a position of the target UE based on the S-RSRP measurement for each sidelink anchor device of the one or more sidelink anchor devices.

Clause 54. A network node, comprising: a memory; at least one transceiver; and at least one processor communicatively coupled to the memory and the at least one transceiver, the at least one processor configured to: send, via the at least one transceiver, a request to a target UE to transmit one or more positioning reference signals (PRS); send, via the at least one transceiver, one or more requests to one or more sidelink anchor devices requesting the one or more sidelink anchor devices to measure the one or more PRS of the target UE; and receive, via the at least one transceiver, from the one or more sidelink anchor devices, one or more PRS measurements taken by the one or more sidelink anchor devices of the one or more PRS of the target UE.

Clause 55. The network node of clause 54, wherein the at least one processor is further configured to: configure the target UE with transmission resources in a sidelink discovery resource pool to broadcast a solicitation message.

Clause 56. The network node of any of clauses 54 to 55, wherein the at least one processor is further configured to: send, via the at least one transceiver, a request to the target UE to transmit a solicitation message.

Clause 57. The network node of any of clauses 54 to 56, wherein the at least one processor is further configured to: receive, via the at least one transceiver, from each sidelink anchor device of the one or more sidelink anchor devices, a signal strength measurement of a solicitation message associated with the target UE.

Clause 58. The network node of clause 57, wherein the signal strength measurement received from each sidelink anchor device of the one or more sidelink anchor devices includes a sidelink reference signal received power (S-RSRP) measurement of the solicitation message associated with the target UE.

Clause 59. The network node of clause 58, wherein the at least one processor is further configured to: estimate a position of the target UE based on the S-RSRP measurement of the solicitation message received by each sidelink anchor device of the one or more sidelink anchor devices.

Clause 60. The network node of any of clauses 58 to 59, wherein: the one or more requests to the one or more sidelink anchor devices to measure the one or more PRS of the target UE are only sent by the network node to sidelink anchor devices having an S-RSRP measurement of the solicitation message associated with the target UE exceeding a threshold.

Clause 61. A user equipment (UE), comprising: means for receiving an announcement message from each sidelink anchor device of one or more sidelink anchor devices, wherein the announcement message includes a sidelink anchor device identifier and an indication that the sidelink anchor device is available for positioning services; means for measuring the announcement message from each sidelink anchor device to determine a signal strength measurement associated with each sidelink anchor device; and means for reporting, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

Clause 62. The UE of clause 61, wherein the means for measuring the announcement message from each sidelink anchor device to determine the signal strength measurement comprises: means for measuring a demodulation reference signal (DMRS) associated with the announcement message from each sidelink anchor device of the one or more sidelink anchor devices.

Clause 63. The UE of any of clauses 61 to 62, wherein: the signal strength measurement includes a sidelink reference signal received power (S-RSRP) measurement.

Clause 64. The UE of clause 63, wherein: only sidelink anchor devices having an S-RSRP measurement exceeding a threshold are reported as the one or more preferred sidelink anchor devices.

Clause 65. The UE of any of clauses 63 to 64, wherein the means for reporting, to the network node, the sidelink anchor device identifiers of the one or more preferred sidelink anchor devices further comprises: means for reporting, to the network node, the S-RSRP measurement associated with each preferred sidelink anchor device of the one or more preferred sidelink anchor devices.

Clause 66. The UE of clause 65, wherein: the S-RSRP measurement is reported to the network node as a differential value with respect to an absolute value, wherein the absolute value corresponds to an S-RSRP measurement associated with a reference sidelink anchor device.

Clause 67. The UE of any of clauses 61 to 66, further comprising: means for receiving, from the network node, a request to measure one or more positioning reference signals (PRS) transmitted by the one or more preferred sidelink anchor devices; and means for reporting measurements of the one or more PRS transmitted by the one or more preferred sidelink anchor devices to the network node.

Clause 68. The UE of any of clauses 61 to 67, further comprising: means for receiving, from the network node, a request for the UE to transmit one or more positioning reference signals (PRS); and means for transmitting the one or more PRS.

Clause 69. The UE of any of clauses 61 to 68, wherein: announcement messages received from the one or more sidelink anchor devices are received in a NACK only groupcast.

Clause 70. The UE of clause 69, wherein: the NACK only groupcast is enabled for distance-based or RSRP-based, hybrid automatic repeat request (HARQ) feedback.

Clause 71. A sidelink anchor device, comprising: means for receiving a solicitation message from each target user equipment (UE) of one or more target UEs, wherein the solicitation message received from each target UE includes a UE identifier; means for measuring the solicitation message received from each target UE to determine a signal strength measurement associated with each target UE; and means for reporting, to a network node, one or more UE identifiers of the one or more target UEs and the signal strength measurement associated with each target UE identified by the one or more UE identifiers.

Clause 72. The sidelink anchor device of clause 71, wherein: the solicitation message received from each target UE of the one or more target UEs is received in a NACK only groupcast.

Clause 73. The sidelink anchor device of clause 72, wherein: the NACK only groupcast is enabled for distance-based or RSRP-based, hybrid automatic repeat request (HARQ) feedback.

Clause 74. A network node, comprising: means for sending a request to each sidelink anchor device of one or more sidelink anchor devices, wherein the request to each sidelink anchor device requests transmission of one or more positioning reference signals (PRS) by the sidelink anchor device; means for sending a request to a target UE requesting the target UE to measure the one or more PRS transmitted by the one or more sidelink anchor devices; and means for receiving, from the target UE, one or more PRS measurements taken by the target UE of the one or more PRS transmitted by the one or more sidelink anchor devices.

Clause 75. The network node of clause 74, further comprising: means for configuring each of the sidelink anchor devices of the one or more sidelink anchor devices with transmission resources in a sidelink discovery resource pool to transmit an announcement message.

Clause 76. The network node of any of clauses 74 to 75, further comprising: means for determining a location of the target UE based on the one or more PRS measurements received from the target UE using time difference of arrival (TDOA) positioning.

Clause 77. The network node of clause 76, further comprising: means for sending a first request to a first sidelink anchor device of the one or more sidelink anchor devices, wherein the first request is a request for the first sidelink anchor device to transmit one or more PRS; means for sending a second request to a second sidelink anchor device of the one or more sidelink anchor devices, wherein the second request is a request for the second sidelink anchor device to measure the one or more PRS of the first sidelink anchor device; means for receiving, from the second sidelink anchor device, one or more PRS measurements taken by the second sidelink anchor device of the one or more PRS of the first sidelink anchor device; and means for compensating for synchronization errors between the first sidelink anchor device and the second sidelink anchor device using the one or more PRS measurements received from the second sidelink anchor device when determining the location of the target UE using the time difference of arrival positioning.

Clause 78. The network node of any of clauses 74 to 77, further comprising: means for sending, to the target UE, a request to transmit one or more PRS; means for sending a request to each sidelink anchor device of one or more sidelink anchor devices, wherein the request to each sidelink anchor device requests the sidelink anchor device to measure the one or more PRS of the target UE; and means for receiving, from the one or more sidelink anchor devices, one or more PRS measurements taken by the one or more sidelink anchor devices of the one or more PRS of the target UE.

Clause 79. The network node of clause 78, further comprising: means for determining a location of the target UE based on the one or more PRS measurements received from the one or more sidelink anchor devices using multi-cell round trip time positioning.

Clause 80. The network node of any of clauses 74 to 79, further comprising: means for receiving, from the target UE, a signal strength measurement for each sidelink anchor device of the one or more sidelink anchor devices, wherein the signal strength measurement corresponds to a measurement of an announcement message received by the target UE from the sidelink anchor device.

Clause 81. The network node of clause 80, wherein the signal strength measurement comprises: a sidelink reference signal received power (S-RSRP) measurement.

Clause 82. The network node of clause 81, wherein: a request to the one or more sidelink anchor devices to transmit the one or more PRS are only sent by the network node to sidelink anchor devices having an S-RSRP measurement of the announcement message, as measured by the target UE, exceeding a threshold.

Clause 83. The network node of any of clauses 81 to 82, further comprising: means for estimating a position of the target UE based on the S-RSRP measurement for each sidelink anchor device of the one or more sidelink anchor devices.

Clause 84. A network node, comprising: means for sending a request to a target UE to transmit one or more positioning reference signals (PRS); means for sending one or more requests to one or more sidelink anchor devices requesting the one or more sidelink anchor devices to measure the one or more PRS of the target UE; and means for receiving, from the one or more sidelink anchor devices, one or more PRS measurements taken by the one or more sidelink anchor devices of the one or more PRS of the target UE.

Clause 85. The network node of clause 84, further comprising: means for configuring the target UE with transmission resources in a sidelink discovery resource pool to broadcast a solicitation message.

Clause 86. The network node of any of clauses 84 to 85, further comprising: means for sending a request to the target UE to transmit a solicitation message.

Clause 87. The network node of any of clauses 84 to 86, further comprising: means for receiving, from each sidelink anchor device of the one or more sidelink anchor devices, a signal strength measurement of a solicitation message associated with the target UE.

Clause 88. The network node of clause 87, wherein the signal strength measurement received from each sidelink anchor device of the one or more sidelink anchor devices includes a sidelink reference signal received power (S-RSRP) measurement of the solicitation message associated with the target UE.

Clause 89. The network node of clause 88, further comprising: means for estimating a position of the target UE based on the S-RSRP measurement of the solicitation message received by each sidelink anchor device of the one or more sidelink anchor devices.

Clause 90. The network node of any of clauses 88 to 89, wherein: the one or more requests to the one or more sidelink anchor devices to measure the one or more PRS of the target UE are only sent by the network node to sidelink anchor devices having an S-RSRP measurement of the solicitation message associated with the target UE exceeding a threshold.

Clause 91. A non-transitory computer-readable medium storing computer-executable instructions that, when executed by a user equipment (UE), cause the UE to: receive an announcement message from each sidelink anchor device of one or more sidelink anchor devices, wherein the announcement message includes a sidelink anchor device identifier and an indication that the sidelink anchor device is available for positioning services; measure the announcement message from each sidelink anchor device to determine a signal strength measurement associated with each sidelink anchor device; and report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

Clause 92. The non-transitory computer-readable medium of clause 91, wherein the computer-executable instructions that, when executed by the UE, cause the UE to measure the announcement message from each sidelink anchor device to determine the signal strength measurement comprise computer-executable instructions that, when executed by the UE, cause the UE to: measure a demodulation reference signal (DMRS) associated with the announcement message from each sidelink anchor device of the one or more sidelink anchor devices.

Clause 93. The non-transitory computer-readable medium of any of clauses 91 to 92, wherein: the signal strength measurement includes a sidelink reference signal received power (S-RSRP) measurement.

Clause 94. The non-transitory computer-readable medium of clause 93, wherein: only sidelink anchor devices having an S-RSRP measurement exceeding a threshold are reported as the one or more preferred sidelink anchor devices.

Clause 95. The non-transitory computer-readable medium of any of clauses 93 to 94, wherein the computer-executable instructions that, when executed by the UE, cause the UE to report, to the network node, the sidelink anchor device identifiers of the one or more preferred sidelink anchor devices comprise computer-executable instructions that, when executed by the UE, cause the UE to: report, to the network node, the S-RSRP measurement associated with each preferred sidelink anchor device of the one or more preferred sidelink anchor devices.

Clause 96. The non-transitory computer-readable medium of clause 95, wherein: the S-RSRP measurement is reported to the network node as a differential value with respect to an absolute value, wherein the absolute value corresponds to an S-RSRP measurement associated with a reference sidelink anchor device.

Clause 97. The non-transitory computer-readable medium of any of clauses 91 to 96, further comprising computer-executable instructions that, when executed by the UE, cause the UE to: receive, from the network node, a request to measure one or more positioning reference signals (PRS) transmitted by the one or more preferred sidelink anchor devices; and report measurements of the one or more PRS transmitted by the one or more preferred sidelink anchor devices to the network node.

Clause 98. The non-transitory computer-readable medium of any of clauses 91 to 97, further comprising computer-executable instructions that, when executed by the UE, cause the UE to: receive, from the network node, a request for the UE to transmit one or more positioning reference signals (PRS); and transmit the one or more PRS.

Clause 99. The non-transitory computer-readable medium of any of clauses 91 to 98, wherein: announcement messages received from the one or more sidelink anchor devices are received in a NACK only groupcast.

Clause 100. The non-transitory computer-readable medium of clause 99, wherein: the NACK only groupcast is enabled for distance-based or RSRP-based, hybrid automatic repeat request (HARQ) feedback.

Clause 101. A non-transitory computer-readable medium storing computer-executable instructions that, when executed by a sidelink anchor device, cause the sidelink anchor device to: receive a solicitation message from each target user equipment (UE) of one or more target UEs, wherein the solicitation message received from each target UE includes a UE identifier; measure the solicitation message received from each target UE to determine a signal strength measurement associated with each target UE; and report, to a network node, one or more UE identifiers of the one or more target UEs and the signal strength measurement associated with each target UE identified by the one or more UE identifiers.

Clause 102. The non-transitory computer-readable medium of clause 101, wherein: the solicitation message received from each target UE of the one or more target UEs is received in a NACK only groupcast.

Clause 103. The non-transitory computer-readable medium of clause 102, wherein: the NACK only groupcast is enabled for distance-based or RSRP-based, hybrid automatic repeat request (HARQ) feedback.

Clause 104. A non-transitory computer-readable medium storing computer-executable instructions that, when executed by a network node, cause the network node to: send a request to each sidelink anchor device of one or more sidelink anchor devices, wherein the request to each sidelink anchor device requests transmission of one or more positioning reference signals (PRS) by the sidelink anchor device; send a request to a target UE requesting the target UE to measure the one or more PRS transmitted by the one or more sidelink anchor devices; and receive, from the target UE, one or more PRS measurements taken by the target UE of the one or more PRS transmitted by the one or more sidelink anchor devices.

Clause 105. The non-transitory computer-readable medium of clause 104, further comprising computer-executable instructions that, when executed by the network node, cause the network node to: configure each of the sidelink anchor devices of the one or more sidelink anchor devices with transmission resources in a sidelink discovery resource pool to transmit an announcement message.

Clause 106. The non-transitory computer-readable medium of any of clauses 104 to 105, further comprising computer-executable instructions that, when executed by the network node, cause the network node to: determine a location of the target UE based on the one or more PRS measurements received from the target UE using time difference of arrival (TDOA) positioning.

Clause 107. The non-transitory computer-readable medium of clause 106, further comprising computer-executable instructions that, when executed by the network node, cause the network node to: send a first request to a first sidelink anchor device of the one or more sidelink anchor devices, wherein the first request is a request for the first sidelink anchor device to transmit one or more PRS; send a second request to a second sidelink anchor device of the one or more sidelink anchor devices, wherein the second request is a request for the second sidelink anchor device to measure the one or more PRS of the first sidelink anchor device; receive, from the second sidelink anchor device, one or more PRS measurements taken by the second sidelink anchor device of the one or more PRS of the first sidelink anchor device; and compensate for synchronization errors between the first sidelink anchor device and the second sidelink anchor device using the one or more PRS measurements received from the second sidelink anchor device when determining the location of the target UE using the time difference of arrival positioning.

Clause 108. The non-transitory computer-readable medium of any of clauses 104 to 107, further comprising computer-executable instructions that, when executed by the network node, cause the network node to: send, to the target UE, a request to transmit one or more PRS; send a request to each sidelink anchor device of one or more sidelink anchor devices, wherein the request to each sidelink anchor device requests the sidelink anchor device to measure the one or more PRS of the target UE; and receive, from the one or more sidelink anchor devices, one or more PRS measurements taken by the one or more sidelink anchor devices of the one or more PRS of the target UE.

Clause 109. The non-transitory computer-readable medium of clause 108, further comprising computer-executable instructions that, when executed by the network node, cause the network node to: determine a location of the target UE based on the one or more PRS measurements received from the one or more sidelink anchor devices using multi-cell round trip time positioning.

Clause 110. The non-transitory computer-readable medium of any of clauses 104 to 109, further comprising computer-executable instructions that, when executed by the network node, cause the network node to: receive, from the target UE, a signal strength measurement for each sidelink anchor device of the one or more sidelink anchor devices, wherein the signal strength measurement corresponds to a measurement of an announcement message received by the target UE from the sidelink anchor device.

Clause 111. The non-transitory computer-readable medium of clause 110, wherein the signal strength measurement comprises: a sidelink reference signal received power (S-RSRP) measurement.

Clause 112. The non-transitory computer-readable medium of clause 111, wherein: a request to the one or more sidelink anchor devices to transmit the one or more PRS are only sent by the network node to sidelink anchor devices having an S-RSRP measurement of the announcement message, as measured by the target UE, exceeding a threshold.

Clause 113. The non-transitory computer-readable medium of any of clauses 111 to 112, further comprising computer-executable instructions that, when executed by the network node, cause the network node to: estimate a position of the target UE based on the S-RSRP measurement for each sidelink anchor device of the one or more sidelink anchor devices.

Clause 114. A non-transitory computer-readable medium storing computer-executable instructions that, when executed by a network node, cause the network node to: send a request to a target UE to transmit one or more positioning reference signals (PRS); send one or more requests to one or more sidelink anchor devices requesting the one or more sidelink anchor devices to measure the one or more PRS of the target UE; and receive, from the one or more sidelink anchor devices, one or more PRS measurements taken by the one or more sidelink anchor devices of the one or more PRS of the target UE.

Clause 115. The non-transitory computer-readable medium of clause 114, further comprising computer-executable instructions that, when executed by the network node, cause the network node to: configure the target UE with transmission resources in a sidelink discovery resource pool to broadcast a solicitation message.

Clause 116. The non-transitory computer-readable medium of any of clauses 114 to 115, further comprising computer-executable instructions that, when executed by the network node, cause the network node to: send a request to the target UE to transmit a solicitation message.

Clause 117. The non-transitory computer-readable medium of any of clauses 114 to 116, further comprising computer-executable instructions that, when executed by the network node, cause the network node to: receive, from each sidelink anchor device of the one or more sidelink anchor devices, a signal strength measurement of a solicitation message associated with the target UE.

Clause 118. The non-transitory computer-readable medium of clause 117, wherein the signal strength measurement received from each sidelink anchor device of the one or more sidelink anchor devices includes a sidelink reference signal received power (S-RSRP) measurement of the solicitation message associated with the target UE.

Clause 119. The non-transitory computer-readable medium of clause 118, further comprising computer-executable instructions that, when executed by the network node, cause the network node to: estimate a position of the target UE based on the S-RSRP measurement of the solicitation message received by each sidelink anchor device of the one or more sidelink anchor devices.

Clause 120. The non-transitory computer-readable medium of any of clauses 118 to 119, wherein: the one or more requests to the one or more sidelink anchor devices to measure the one or more PRS of the target UE are only sent by the network node to sidelink anchor devices having an S-RSRP measurement of the solicitation message associated with the target UE exceeding a threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving an announcement message from each sidelink anchor device of one or more sidelink anchor devices, wherein the announcement message includes a sidelink anchor device identifier and an indication that the sidelink anchor device is available for positioning services;

measuring the announcement message from each sidelink anchor device to determine a signal strength measurement associated with each sidelink anchor device; and reporting, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

2. The method of claim 1, wherein measuring the announcement message from each sidelink anchor device to determine the signal strength measurement comprises:

measuring a demodulation reference signal (DMRS) associated with the announcement message from each sidelink anchor device of the one or more sidelink anchor devices.

3. The method of claim 1, wherein:

the signal strength measurement includes a sidelink reference signal received power (S-RSRP) measurement.

4. The method of claim 3, wherein:

only sidelink anchor devices having an S-RSRP measurement exceeding a threshold are reported as the one or more preferred sidelink anchor devices.

5. The method of claim 3, wherein reporting, to the network node, the sidelink anchor device identifiers of the one or more preferred sidelink anchor devices further comprises:

reporting, to the network node, the S-RSRP measurement associated with each preferred sidelink anchor device of the one or more preferred sidelink anchor devices.

6. The method of claim 5, wherein:

the S-RSRP measurement is reported to the network node as a differential value with respect to an absolute value, wherein the absolute value corresponds to an S-RSRP measurement associated with a reference sidelink anchor device.

7. The method of claim 1, further comprising:

receiving, from the network node, a request to measure one or more positioning reference signals (PRS) transmitted by the one or more preferred sidelink anchor devices; and reporting measurements of the one or more PRS transmitted by the one or more preferred sidelink anchor devices to the network node.

8. The method of claim 1, further comprising:

receiving, from the network node, a request for the UE to transmit one or more positioning reference signals (PRS); and transmitting, by the UE, the one or more PRS.

9. The method of claim 1, wherein:

announcement messages received from the one or more sidelink anchor devices are received in a NACK only groupcast.

10. The method of claim 9, wherein:

the NACK only groupcast is enabled for distance-based or RSRP-based, hybrid automatic repeat request (HARQ) feedback.

11. A method of wireless communication performed by a sidelink anchor device, comprising:

receiving a solicitation message from each target user equipment (UE) of one or more target UEs, wherein the solicitation message received from each target UE includes a UE identifier;

measuring the solicitation message received from each target UE to determine a signal strength measurement associated with each target UE; and reporting, to a network node, one or more UE identifiers of the one or more target UEs and the signal strength measurement associated with each target UE identified by the one or more UE identifiers.

12. The method of claim 11, wherein:

the solicitation message received from each target UE of the one or more target UEs is received in a NACK only groupcast.

13. The method of claim 12, wherein:

the NACK only groupcast is enabled for distance-based or RSRP-based, hybrid automatic repeat request (HARQ) feedback.

14. A user equipment (UE), comprising:

a memory;

at least one transceiver; and at least one processor communicatively coupled to the memory and the at least one transceiver, the at least one processor configured to:

receive, via the at least one transceiver, an announcement message from each sidelink anchor device of one or more sidelink anchor devices, wherein the announcement message includes a sidelink anchor device identifier and an indication that the sidelink anchor device is available for positioning services;

measure the announcement message from each sidelink anchor device to determine a signal strength measurement associated with each sidelink anchor device; and report, to a network node, one or more preferred sidelink anchor devices from the one or more sidelink anchor devices, wherein the one or more preferred sidelink anchor devices are determined based on the signal strength measurement respectively associated with each sidelink anchor device of the one or more sidelink anchor devices.

15. The UE of claim 14, wherein, to measure the announcement message from each sidelink anchor device to determine the signal strength measurement, the at least one processor is configured to:

measure a demodulation reference signal (DMRS) associated with the announcement message from each sidelink anchor device of the one or more sidelink anchor devices.

16. The UE of claim 14, wherein:

the signal strength measurement includes a sidelink reference signal received power (S-RSRP) measurement.

17. The UE of claim 16, wherein:

only sidelink anchor devices having an S-RSRP measurement exceeding a threshold are reported as the one or more preferred sidelink anchor devices.

18. The UE of claim 16, wherein, to report, to the network node, the sidelink anchor device identifiers of the one or more preferred sidelink anchor devices, the at least one processor is configured to:

report, to the network node, the S-RSRP measurement associated with each preferred sidelink anchor device of the one or more preferred sidelink anchor devices.

19. The UE of claim 18, wherein:

the S-RSRP measurement is reported to the network node as a differential value with respect to an absolute value, wherein the absolute value corresponds to an S-RSRP measurement associated with a reference sidelink anchor device.

20. The UE of claim 14, wherein the at least one processor is further configured to:

receive, via the at least one transceiver, from the network node, a request to measure one or more positioning reference signals (PRS) transmitted by the one or more preferred sidelink anchor devices; and report measurements of the one or more PRS transmitted by the one or more preferred sidelink anchor devices to the network node.

21. The UE of claim 14, wherein the at least one processor is further configured to:

receive, via the at least one transceiver, from the network node, a request for the UE to transmit one or more positioning reference signals (PRS); and transmit, via the at least one transceiver, the one or more PRS.

22. The UE of claim 14, wherein:

announcement messages received from the one or more sidelink anchor devices are received in a NACK only groupcast.

23. The UE of claim 22, wherein:

the NACK only groupcast is enabled for distance-based or RSRP-based, hybrid automatic repeat request (HARQ) feedback.

24. A sidelink anchor device, comprising:

a memory;

at least one transceiver; and at least one processor communicatively coupled to the memory and the at least one transceiver, the at least one processor configured to:

receive, via the at least one transceiver, a solicitation message from each target user equipment (UE) of one or more target UEs, wherein the solicitation message received from each target UE includes a UE identifier;

measure the solicitation message received from each target UE to determine a signal strength measurement associated with each target UE; and report, to a network node, one or more UE identifiers of the one or more target UEs and the signal strength measurement associated with each target UE identified by the one or more UE identifiers.

25. The sidelink anchor device of claim 24, wherein:

the solicitation message received from each target UE of the one or more target UEs is received in a NACK only groupcast.

26. The sidelink anchor device of claim 25, wherein:

the NACK only groupcast is enabled for distance-based or RSRP-based, hybrid automatic repeat request (HARQ) feedback.

* * * * *